(12) United States Patent
Koprivnak et al.

(10) Patent No.: US 9,656,340 B2
(45) Date of Patent: May 23, 2017

(54) SYSTEMS AND METHODS PROVIDING LOW CURRENT REGULATION FOR AC ARC WELDING PROCESSES

(71) Applicant: Lincoln Global, Inc., City of Industry, CA (US)

(72) Inventors: George B. Koprivnak, Painesville, OH (US); Robert L. Dodge, Mentor, OH (US)

(73) Assignee: LINCOLN GLOBAL, INC., Santa Fe Springs, CA (US)

( * ) Notice: Subject to any disclaimer, the term of this patent is extended or adjusted under 35 U.S.C. 154(b) by 361 days.

(21) Appl. No.: 14/248,410

(22) Filed: Apr. 9, 2014

(65) Prior Publication Data
US 2014/0203006 A1 Jul. 24, 2014

Related U.S. Application Data

(63) Continuation-in-part of application No. 13/625,177, filed on Sep. 24, 2012, now Pat. No. 9,114,471.

(60) Provisional application No. 61/900,635, filed on Nov. 6, 2013.

(51) Int. Cl.
*B23K 9/073* (2006.01)
*B23K 9/10* (2006.01)

(52) U.S. Cl.
CPC .......... *B23K 9/0738* (2013.01); *B23K 9/1012* (2013.01)

(58) Field of Classification Search
CPC .... B23K 9/0738; B23K 9/067; B23K 9/0673; B23K 9/1012
See application file for complete search history.

(56) References Cited

U.S. PATENT DOCUMENTS

| 1,993,852 A | 3/1935 | Miller |
| 4,322,602 A * | 3/1982 | Grist ...................... B23K 9/091 219/130.33 |
| 4,371,776 A | 2/1983 | Winn |
| 4,544,826 A | 10/1985 | Nakanishi et al. |

(Continued)

FOREIGN PATENT DOCUMENTS

| CA | 2139715 | 8/1995 |
| DE | 19828869 A1 | 12/1999 |

(Continued)

OTHER PUBLICATIONS

Machine Translation—DE 20114660-2001.*

(Continued)

*Primary Examiner* — Brian Jennison
(74) *Attorney, Agent, or Firm* — Foley & Lardner LLP

(57) ABSTRACT

Systems and methods providing low current regulation for AC arc welding processes to regulate arc welding performance. In arc welding power source embodiments, configurations of bridge and arc regulation circuits allow for the directional switching of the welding output current through the welding output circuit path and induce a voltage between the electrode and the workpiece of the welding output circuit path that is sufficient to re-ignite the arc during polarity transition of the output current. The arc regulation circuit provides a high inductance level for storing energy, in both polarities, which induces the voltage level for re-igniting the arc during the zero crossing of the output current and provides low end stabilization of arc current.

22 Claims, 15 Drawing Sheets

(56) References Cited

U.S. PATENT DOCUMENTS

| | | | |
|---|---|---|---|
| 4,972,064 | A | 11/1990 | Stava |
| 5,338,916 | A | 8/1994 | Blankenship et al. |
| 5,710,696 | A | 1/1998 | Reynolds et al. |
| 5,958,261 | A | 9/1999 | Offer et al. |
| 6,034,350 | A | 3/2000 | Heraly et al. |
| 6,051,810 | A | 4/2000 | Stava et al. |
| 6,215,100 | B1 | 4/2001 | Stava |
| 6,384,373 | B1 | 5/2002 | Schwartz |
| 6,833,529 | B2 | 12/2004 | Ueyama et al. |
| 7,385,159 | B2 | 6/2008 | Stava |
| 7,919,728 | B2 | 4/2011 | Era et al. |
| 8,067,714 | B2 | 11/2011 | Era et al. |
| 8,299,398 | B2 | 10/2012 | Madsen |
| 2004/0074884 | A1 | 4/2004 | Butler |
| 2007/0051712 | A1* | 3/2007 | Kooken ................ B23K 9/095 219/130.1 |
| 2008/0264915 | A1 | 10/2008 | Manthe et al. |
| 2012/0118865 | A1 | 5/2012 | Stava et al. |
| 2013/0162136 | A1 | 6/2013 | Baldwin et al. |

FOREIGN PATENT DOCUMENTS

| | | |
|---|---|---|
| DE | 20114660 | 2/2002 |
| DE | 10245368 | 4/2004 |
| EP | 0538227 | 4/1993 |
| GB | 2081156 A | 2/1982 |
| JP | 63171267 A | 7/1988 |
| WO | 9839138 | 9/1998 |

OTHER PUBLICATIONS

PCTG/IB2014/002367—International Search Report and Written Opinion of the International Searching Authority mailed Jun. 29, 2015.

\* cited by examiner

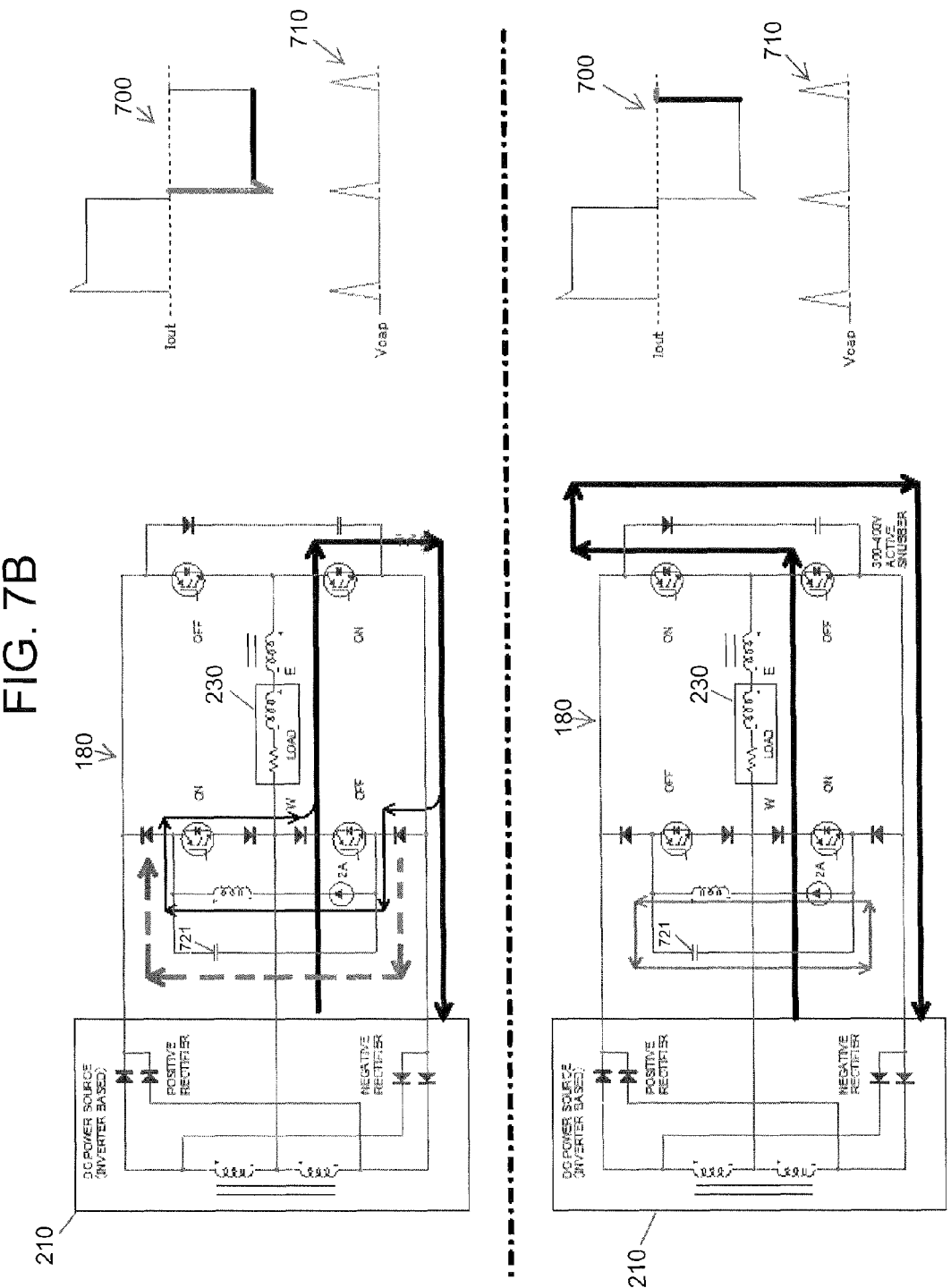

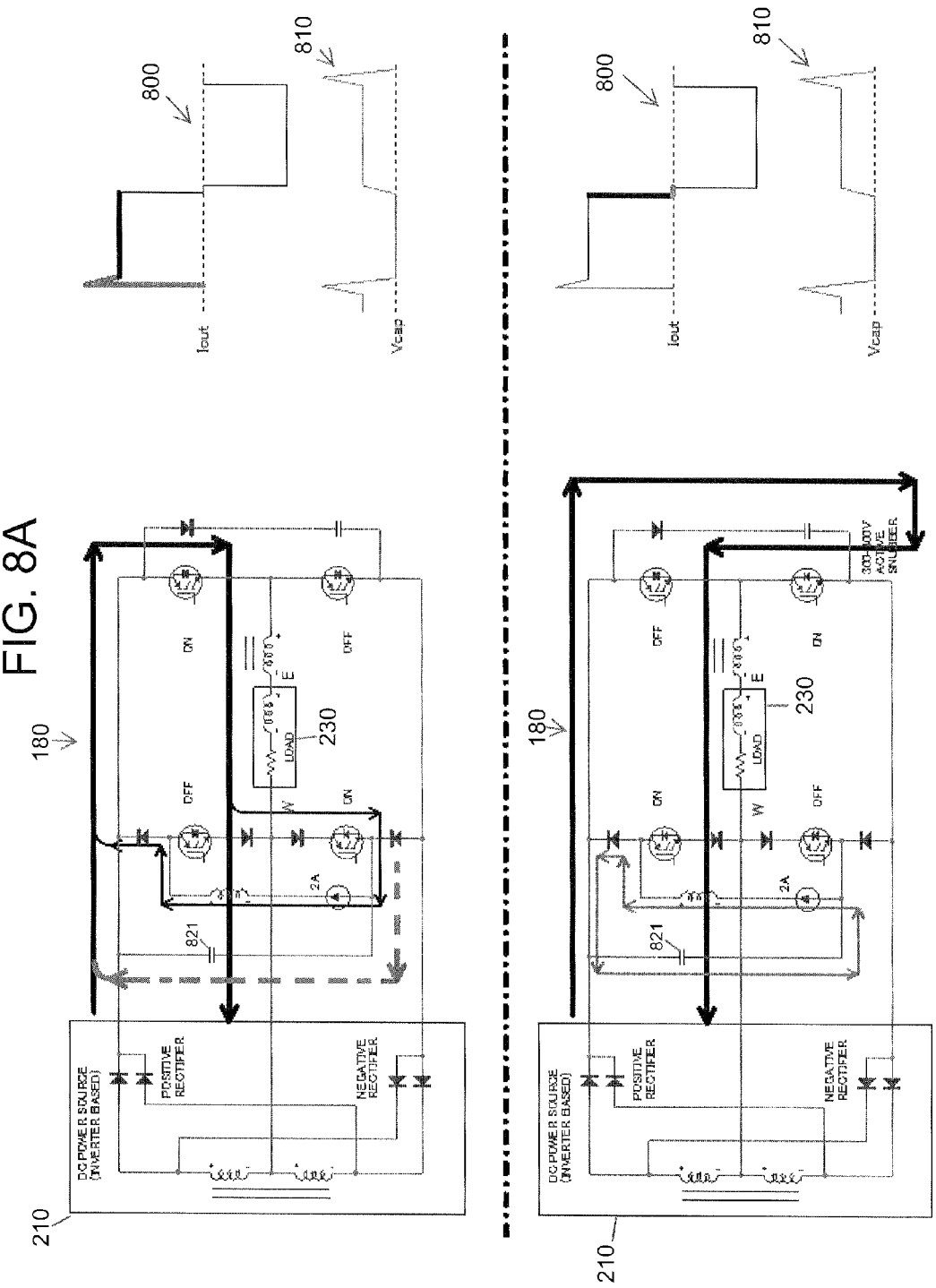

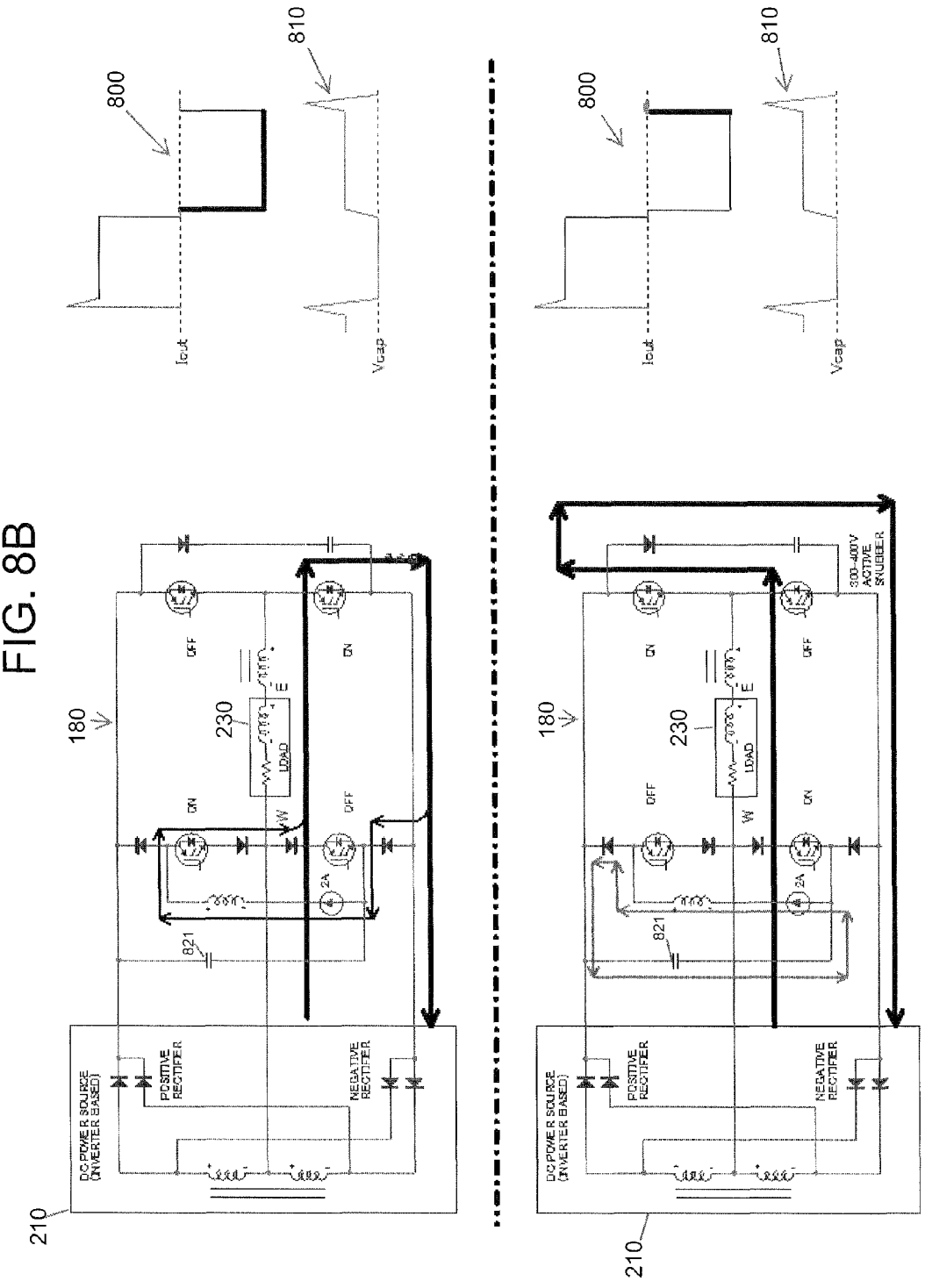

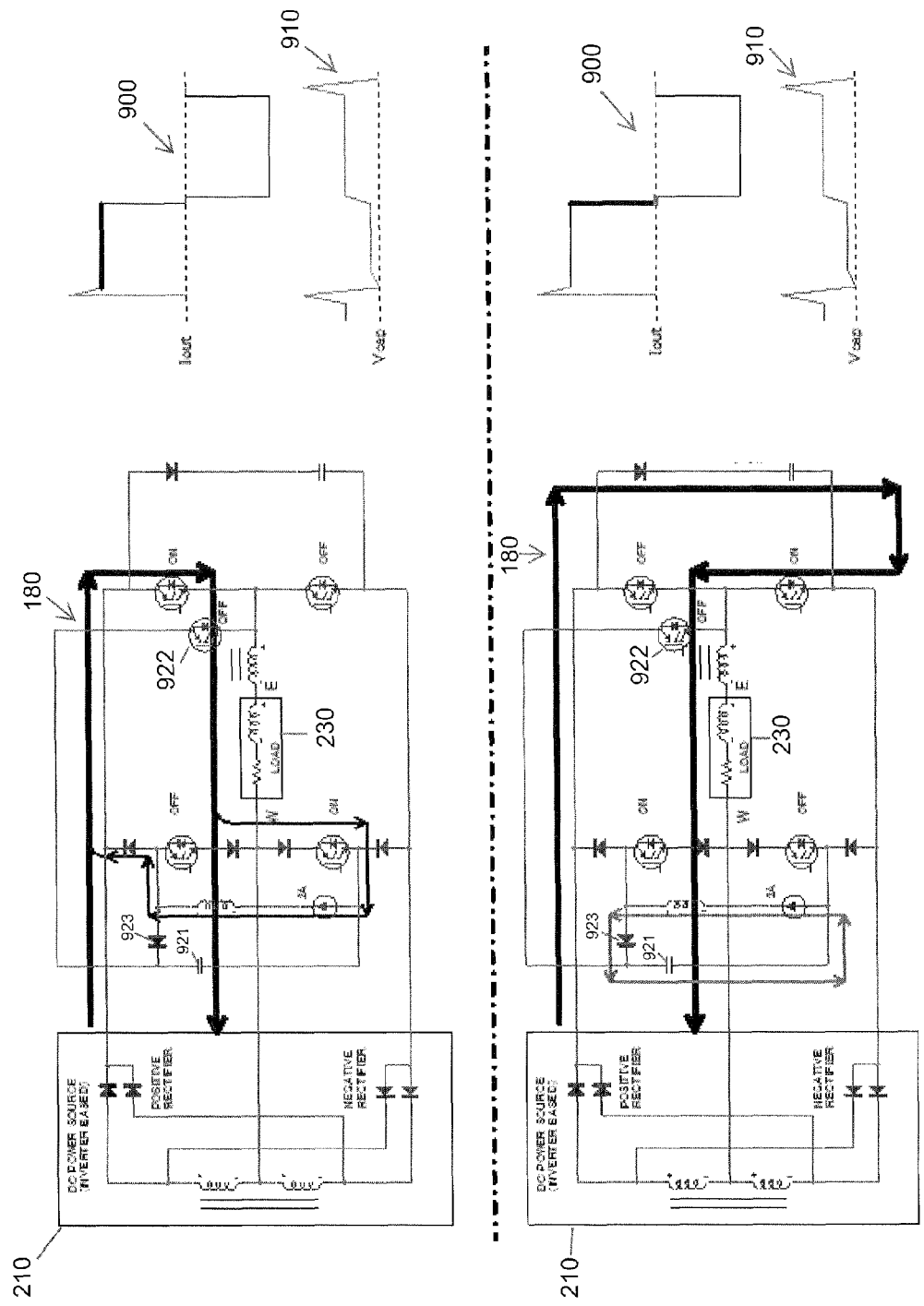

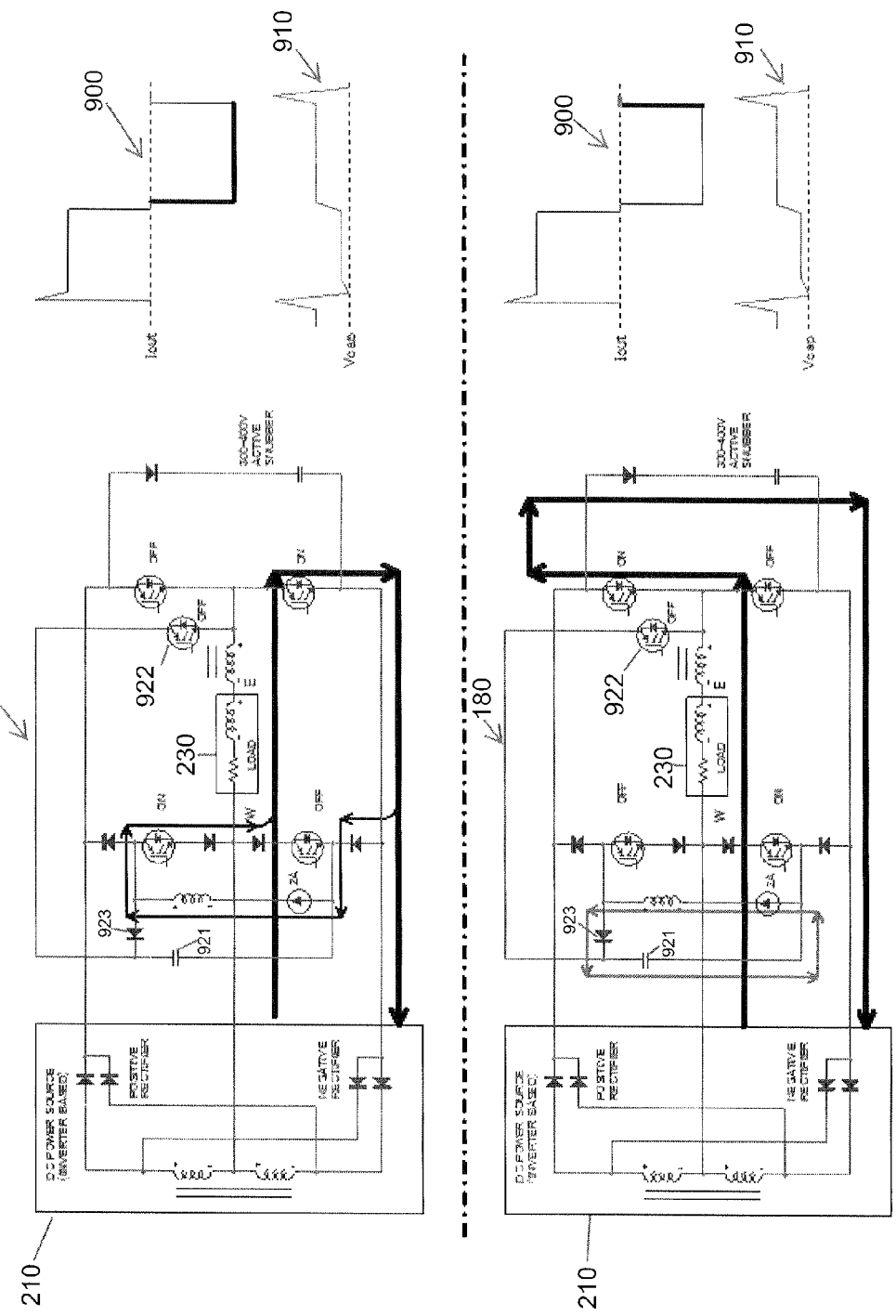

SYSTEMS AND METHODS PROVIDING LOW CURRENT REGULATION FOR AC ARC WELDING PROCESSES

CROSS-REFERENCE TO RELATED APPLICATIONS

This U.S. Patent Application claims priority to and the benefit of provisional U.S. Patent Application No. 61/900,635 filed on Nov. 6, 2013, and is a continuation-in-part of U.S. patent application Ser. No. 13/625,177 filed on Sep. 24, 2012, each of which are incorporated herein by reference in their entirety.

TECHNICAL FIELD

Certain embodiments of the present invention relate to arc welding. More particularly, certain embodiments of the present invention relate to systems and methods for providing low current regulation for AC arc welding processes to regulate arc welding performance.

BACKGROUND

Certain prior art welding systems use bridge topologies in a welding power source to provide AC welding capability. A half-bridge topology may be used in a welding power source having dual output current paths configured to share a common path, such that each output can induce a flow of opposite polarity in the shared path. In practice, many welding power sources are configured as such and may require only the addition of a second set of rectifier devices to complete the second path. A switch may be placed in the non-shared path of each power source leg and the direction of current flow through a connected welding output circuit path is determined by the active leg. A full bridge topology may be used with just about any power source topology, providing flexibility and the potential to be added to existing designed power sources. The full bridge topology allows easy implementation of zero cross assisting circuits. A blocking diode may be used to protect the devices in the power source from high voltage transients that occur during the zero cross. For many welding processes such as, for example, an AC gas tungsten arc welding (GTAW or TIG) process or a gas metal arc welding (GMAW or MIG) process, it is desirable for the arc between the electrode and the workpiece to quickly re-ignite in the opposite polarity direction when the welding current crosses zero.

A welding power source may have a maximum voltage level (e.g., 100 VDC) that it is designed to output. When an AC welding current crosses zero (i.e., changes polarity), a higher voltage (e.g., 300 VDC) may be demanded from the power source than the power source can provide, to keep the arc lit and make the arc more stable when the arc current is low, and to re-ignite the arc between the electrode and the workpiece. As a result, the arc may extinguish and not re-establish. In TIG welding (where there is no wire electrode), if the arc extinguishes, the welding power source may have to repeat the entire arc-establishment process before welding can continue, resulting in an inefficient welding process. In general, the plasma column associated with low current arc welding tends to be unstable and can result in undesired arc outages.

Further limitations and disadvantages of conventional, traditional, and proposed approaches will become apparent to one of skill in the art, through comparison of such systems and methods with embodiments of the present invention as set forth in the remainder of the present application with reference to the drawings.

SUMMARY

Embodiments of the present invention include systems and methods for providing low current regulation for DC and AC arc welding processes to regulate arc welding performance by regulating welding output current and providing a means to generate a voltage for re-ignition during polarity transition to ensure re-ignition of the arc. The introduction of a higher voltage level between the welding electrode and the workpiece at and around polarity transition of the welding current is provided to readily and reliably re-ignite the arc in the opposite polarity, even though the voltage from the power source is limited. AC welding, variable polarity welding (e.g., DC welding in either polarity), and other hybrid welding processes are supported. Configurations of polarity reversing bridge circuits and arc regulation circuits allow for the directional switching of the output welding current through the welding output circuit path while also allowing for improved low current regulation and the rapid re-igniting of the arc when the welding current changes polarity. An arc regulation circuit having an inductor and a constant current source provides the voltage needed during current polarity transition to quickly and reliably re-ignite the arc. In some embodiments, a superposition capacitor may provide additional stored energy to assist with re-igniting the arc during one or both of the polarity transitions.

One embodiment of the present invention is a welding power source. The welding power source includes a controller, and a power conversion circuit configured to convert an input current to an output current. The power conversion circuit may be transformer based with a half bridge output topology. The power conversion circuit may include a DC output topology. The power conversion circuit may be an inverter-based circuit or a chopper-based circuit, for example. The welding power source also includes a bridge circuit operatively connected to the power conversion circuit and configured to switch a direction of the output current through a welding output circuit path operatively connected to a welding output of the welding power source at the command of the controller. The bridge circuit may be configured as a half bridge circuit or as a full bridge circuit, for example. The bridge circuit may include, for example, at least two switching transistors. The welding power source further includes an arc regulation circuit operatively connected to the bridge circuit and configured to induce a voltage between an electrode and a workpiece of the welding output circuit path sufficient for arc re-ignition during polarity transition of the output current. The arc regulation circuit may include, for example, at least one inductor and at least one constant current source. The constant current source provides a regulated constant current of between, for example, 2-10 amps across the arc, providing low output current regulation. The value of the at least one inductor may be between about 10 to 100 milli-henries (e.g., 20 milli-henries), in accordance with various embodiments. The power conversion circuit, the bridge circuit, and the arc regulation circuit may be configured to provide any of a DC positive welding operation, a DC negative welding operation, and an AC welding operation at the command of the controller of the welding power source. In accordance with an alternative embodiment, the bridge circuit and the arc regulation circuit may be external to the welding power source, for example, in the form of a module that operatively connects to the welding power source.

One embodiment of the present invention is a welding power source. The welding power source includes means for converting an input current to an output current and means for switching a direction of the output current through a welding output circuit path operatively connected to a welding output of the welding power source to provide at least an AC welding operation. The welding power source also includes means for inducing a voltage between a welding electrode and a welding workpiece of the welding output circuit path during a polarity transition of the output current to automatically re-establish an arc between the welding electrode and the workpiece in an opposite polarity.

One embodiment of the present invention is a method. The method includes converting an input current to an output current in a welding power source. The method also includes switching a direction of the output current through a welding output circuit path operatively connected to a welding output of the welding power source from a first direction to a second direction at the command of a controller of the welding power source. The method further includes inducing a voltage level between a welding electrode and a workpiece of the welding output circuit path sufficient to automatically re-ignite an arc between the electrode and the workpiece in the second direction as part of switching to the second direction. The method may also include switching a direction of the output current through the welding output circuit path from the second direction to the first direction at the command of the controller of the welding power source, and further inducing a voltage level between the welding electrode and the workpiece of the welding output circuit path sufficient to automatically re-ignite an arc between the electrode and the workpiece in the first direction as part of switching to the first direction. The steps of inducing a voltage level may be achieved by an arc regulation circuit having at least one inductor and at least one constant current source.

One embodiment of the present invention is a welding power source. The welding power source includes a bridge circuit configured to provide an AC welding output current. The welding power source further includes an arc regulation circuit operatively connected to the bridge circuit and configured to induce a voltage at a welding output of the welding power source being of sufficient magnitude to automatically re-ignite an arc in an output circuit path connected to the welding output upon reversal of a polarity of a welding output current through the output circuit path. The arc regulation circuit may include at least one inductor and at least one constant current source.

One embodiment of the present invention is a welding power source. The welding power source includes a current switching circuit having at least one inductor and at least one constant current source, wherein the at least one inductor and the at least one constant current source are configured to induce a voltage across a load connected to a welding output of the welding power source sufficient to re-ignite a welding arc across the load upon reversal of a polarity of a welding output current through the load. The current switching circuit may be configured as one of a half bridge circuit or a full bridge circuit, for example.

Details of illustrated embodiments of the present invention will be more fully understood from the following description and drawings.

BRIEF DESCRIPTION OF THE DRAWINGS

FIGS. 7A-7B illustrate the operation of the welding power source in FIG. 2, including the optional superposition capacitor, when implementing an AC welding output current waveform;

FIGS. 8A-8B illustrate the operation of another embodiment of a welding power source including a superposition capacitor when implementing an AC welding output current waveform; and FIGS. 9A-9C illustrate the operation of another embodiment of a welding power source, including an independent discharge control of a superposition capacitor, when implementing an AC welding output current waveform.

DETAILED DESCRIPTION

Figure 1:
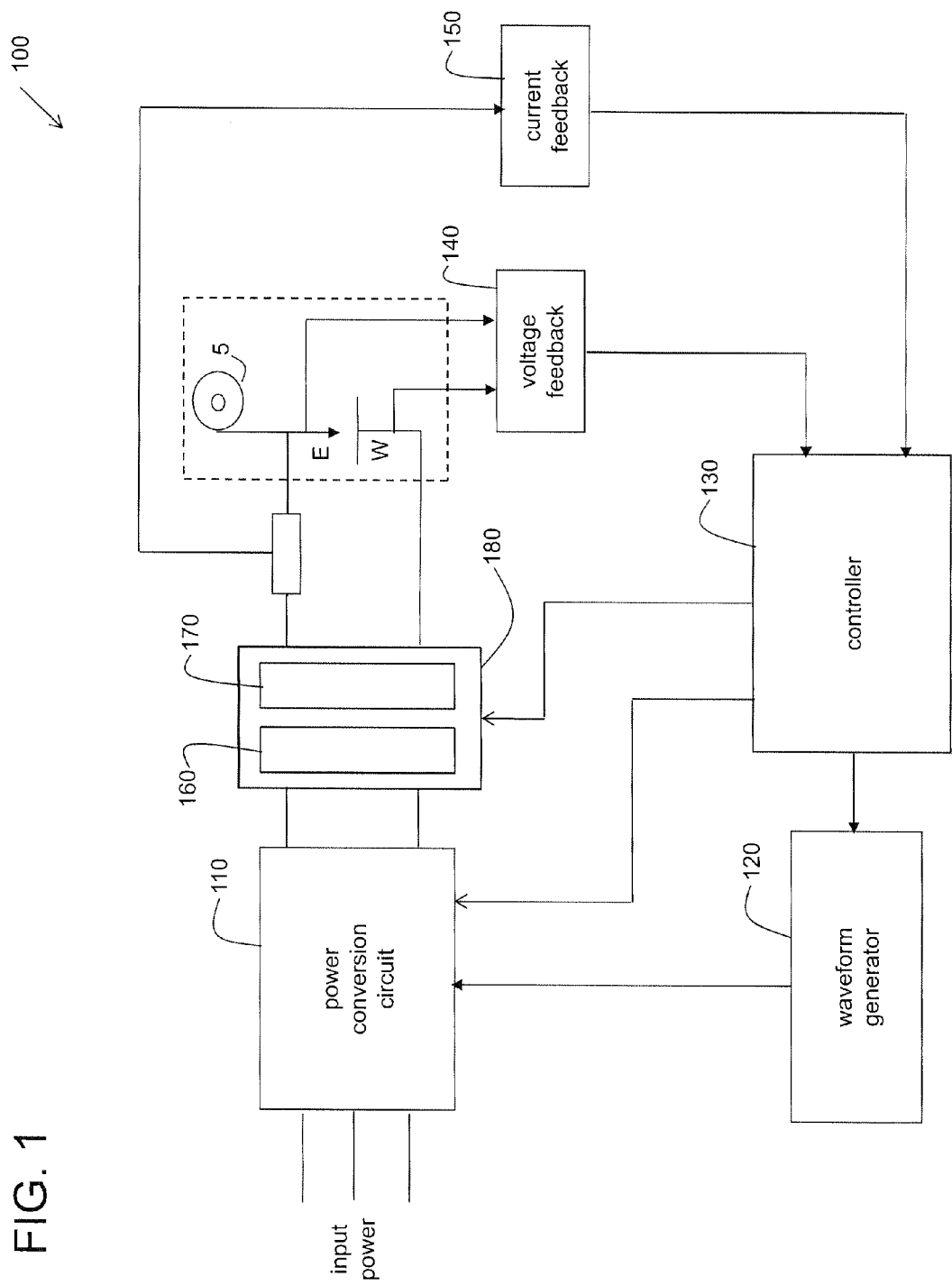
FIG. 1 illustrates a schematic block diagram of an exemplary embodiment of a welding power source operatively connected to a welding electrode and a workpiece.

The following are definitions of exemplary terms that may be used within the disclosure. Both singular and plural forms of all terms fall within each meaning:

"Software" or "computer program" as used herein includes, but is not limited to, one or more computer readable and/or executable instructions that cause a computer or other electronic device to perform functions, actions, and/or behave in a desired manner. The instructions may be embodied in various forms such as routines, algorithms, modules or programs including separate applications or code from dynamically linked libraries. Software may also be implemented in various forms such as a stand-alone program, a function call, a servlet, an applet, an application, instructions stored in a memory, part of an operating system or other type of executable instructions. It will be appreciated by one of ordinary skill in the art that the form of software is dependent on, for example, requirements of a desired application, the environment it runs on, and/or the desires of a designer/programmer or the like.

"Computer" or "processing element" or "computer device" as used herein includes, but is not limited to, any programmed or programmable electronic device that can store, retrieve, and process data. "Non-transitory computer-readable media" include, but are not limited to, a CD-ROM, a removable flash memory card, a hard disk drive, a magnetic tape, and a floppy disk.

"Welding tool", as used herein, refers to, but is not limited to, a welding gun, a welding torch, or any welding device that accepts a consumable or non-consumable welding electrode for the purpose of applying electrical power to the welding electrode provided by a welding power source.

"Welding output circuit path", as used herein, refers to the electrical path from a first side of the welding output of a welding power source, through a first welding cable (or a first side of a welding cable), to a welding electrode, to a workpiece (either through a short or an arc between the welding electrode and the workpiece), through a second welding cable (or a second side of a welding cable), and back to a second side of the welding output of the welding power source.

"Welding cable", as used herein, refers to the electrical cable that may be connected between a welding power source and a welding electrode and workpiece (e.g. through a welding wire feeder) to provide electrical power to create an arc between the welding electrode and the workpiece.

"Welding output", as used herein, may refer to the electrical output circuitry or output port or terminals of a welding power source, or to the electrical power, voltage, or current provided by the electrical output circuitry or output port of a welding power source, or to the load connected to an output of a welding power source.

"Computer memory", as used herein, refers to a storage device configured to store digital data or information which can be retrieved by a computer or processing element.

"Controller", as used herein, refers to the logic circuitry and/or processing elements and associated software or program involved in controlling a welding power source.

The terms "signal", "data", and "information" may be used interchangeably herein and may be in digital or analog form.

The term "AC welding" is used generally herein and may refer to actual AC welding, DC welding in both positive and negative polarities, variable polarity welding, and other hybrid welding processes.

The plasma column associated with low current arc welding tends to be unstable and can lead to undesired arc outages. Additionally, for AC welding processes, the arc current stops and changes direction during the zero transition. Depending on the state of the arc plasma and gases surrounding the weld, the arc may or may not re-ignite. Embodiments of the present invention include a low current arc regulation circuit providing a well-controlled current with a significant amount of inductance providing a high energy constant current source to stabilize the arc plasma. During a polarity change, the arc current decays to zero prior to advancing in the opposite polarity. During this polarity transition time, both the current from the arc and the arc regulation circuit flows into a high voltage snubber circuit. The high voltage imposed by the snubber circuit rapidly depletes all of the arc energy. However, only a small portion of the arc regulation circuit energy is depleted. When the energy of the weld circuit inductance is depleted, the welding output is able to reverse polarity. The arc re-ignition voltage is provided by energy stored in the inductor of the arc regulation circuit and is limited by the high voltage snubber circuit. Once the arc is re-established, the current from the arc regulation circuit is diverted back to the arc, and the voltage collapses back to that which is required to maintain the arc.

FIG. 1 illustrates a schematic block diagram of an exemplary embodiment of a welding power source 100 operatively connected to a welding electrode E and a workpiece W. The welding power source 100 includes a power conversion circuit 110 providing welding output power between the welding electrode E and the workpiece W. The power conversion circuit 110 may be transformer based with a half bridge output topology. For example, the power conversion circuit 110 may be of an inverter type that includes an input power side and an output power side, for example, as delineated by the primary and secondary sides, respectively, of a welding transformer. Other types of power conversion circuits are possible as well such as, for example, a chopper type having a DC output topology. An optional wire feeder 5 may feed a consumable wire welding electrode E toward the workpiece W. Alternatively, as in a GTAW process, the electrode E may be non-consumable and the wire feeder 5 may not be used, or may be used to provide a filler wire toward the workpiece W. The wire feeder 5, the consumable welding electrode E, and the workpiece W are not part of the welding power source 100 but may be operatively connected to the welding power source 100 via a welding output cable.

The welding power source 100 further includes a waveform generator 120 and a controller 130. The waveform generator 120 generates welding waveforms at the command of the controller 130. A waveform generated by the waveform generator 120 modulates the output of the power conversion circuit 110 to produce the welding output current between the electrode E and the workpiece W.

The welding power source 100 may further include a voltage feedback circuit 140 and a current feedback circuit 150 to monitor the welding output voltage and current between the electrode E and the workpiece W and provide the monitored voltage and current back to the controller 130. The feedback voltage and current may be used by the controller 130 to make decisions with respect to modifying the welding waveform generated by the waveform generator 120 and/or to make other decisions that affect safe operation of the welding power source 100, for example.

The welding power source 100 also includes a current switching circuit 180 having a bridge circuit 160 and an arc regulation circuit 170. The bridge circuit 160 is operatively connected to the power conversion circuit 110 and is configured to switch a direction of the output current through a low impedance welding output circuit path (including the electrode E and the workpiece W) operatively connected to a welding output of the welding power source 100 at the command of the controller 130. The arc regulation circuit is operatively connected to the bridge circuit and is configured to provide a well-regulated low value current supply to stabilize low end welding and assist in current transitions in polarity about zero (e.g., by inducing a voltage between the electrode E and the workpiece W of the welding output circuit path that is sufficient to re-ignite the arc during a polarity transition of the output current). Detailed examples and operation of such bridge and arc regulating circuits are described in detail later herein.

Figure 2:
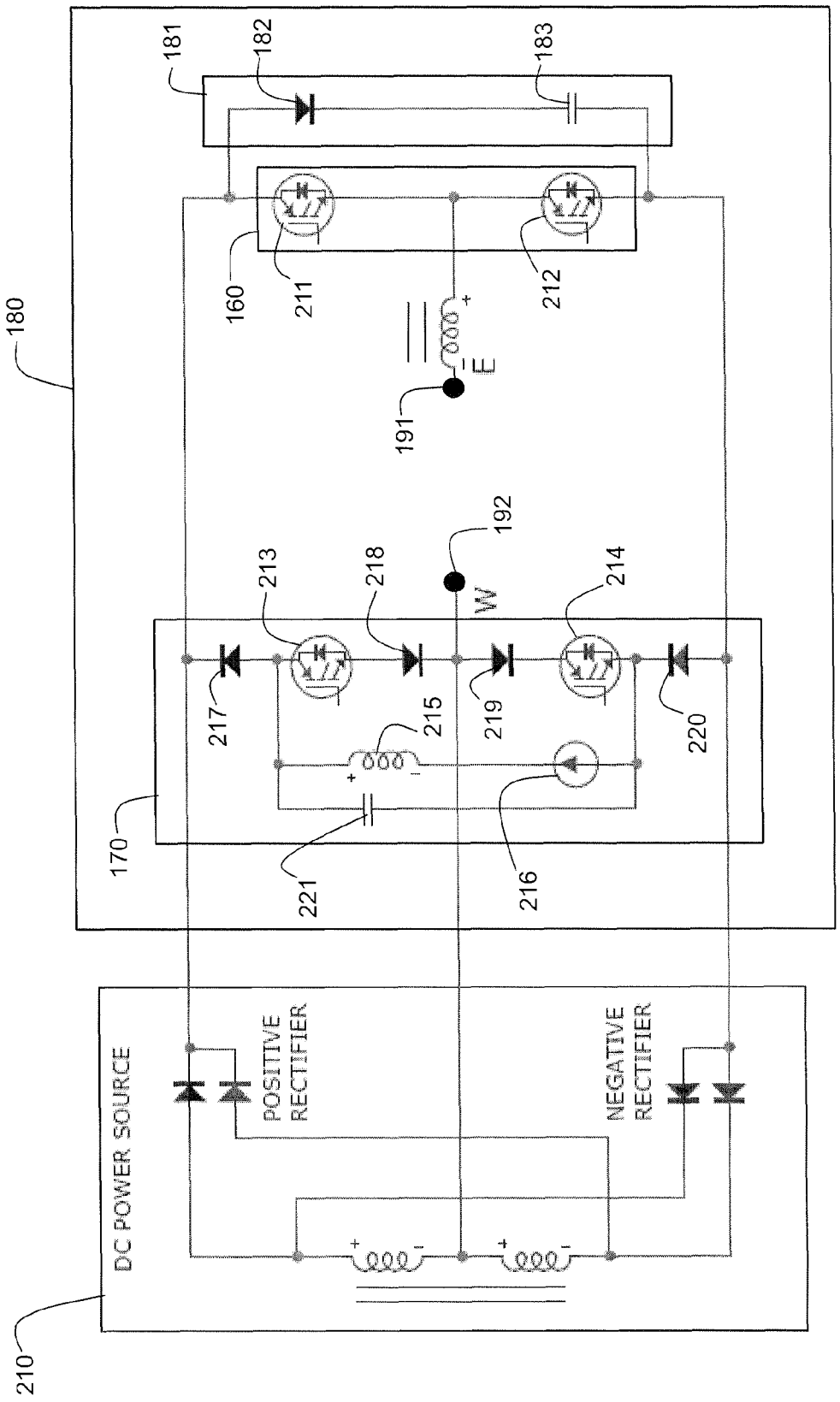
FIG. 2 illustrates a schematic diagram of a first exemplary embodiment of a portion of the welding power source of FIG. 1 having a bridge circuit and a bi-polar arc regulation circuit.

FIG. 2 illustrates a schematic diagram of a first exemplary embodiment of a portion of the welding power source 100 of FIG. 1 having a bridge circuit 160 and a bi-polar arc regulation circuit 170. Also illustrated in FIG. 2 is a portion 210 of the power conversion circuit 110, where the power conversion circuit 110 is a center-tapped or half bridge topology (e.g., an inverter-based circuit). The current switching circuit 180 of FIG. 2 is in the form of a half bridge topology where the power conversion circuit 110 provides dual output current paths configured to share a common path, such that each output path can induce a flow of opposite polarity in the shared path.

The bridge circuit 160 includes switching transistors 211 and 212. The arc regulating circuit 170 includes switching transistors 213 and 214, inductor 215, constant current source 216, diodes 217-220 and, optionally, superposition capacitor 221. In accordance with an embodiment, the switching transistors are insulated gate bipolar transistors (IGBTs). However, other types of switching transistors may be used as well (e.g., metal-oxide semiconductor field effect transistors or MOSFETs), in accordance with other embodiments. In accordance with an embodiment, the constant current source may be adjustable (e.g., between 2 amps and 10 amps). An active snubber circuit 181, having a diode 182 and a capacitor 183, is used to limit the voltage across the current switching circuit 180 (e.g., somewhere between 300 V and 600 V) to cause the output current through the output circuit path to decay quickly and limit or bound the arc re-ignition voltage level. The anti-parallel diodes of the switching transistors 211 and 212 carry the snubber/decay current. Pre-charging of the inductor (e.g., by shorting across the transistors of the arc regulation circuit 170) may be desired such that the inductor has stored energy and is ready to perform initial arc ignition functions (at the start of the welding process) or arc re-ignition functions (at zero crossings) more quickly.

The optional superposition capacitor 221 of the arc regulation circuit 170 may be used to provide a modest overshoot through zero current during polarity switching. The capacitor 221 may store energy from the inductor of the arc regulation circuit during the bridge deadtime. The energy may be released when the arc is re-established in the opposite polarity, providing an extra boost or overshoot in addition to the current provided by the constant current source and inductor. In FIG. 2, the capacitor is connected directly across the current source 216 and the inductor 215. The inductor charges the capacitor during the deadtime, and the capacitor releases energy to the load when the bridge circuit 160 turns back ON. This cycle occurs at each polarity change. The top of the capacitor 221 may be connected to the cathode of the diode 217 instead of to the inductor 215, still allowing charging on both half cycles but releasing energy only on the negative to positive transition, thus minimizing the required deadtime per cycle to charge while maximizing the stored energy.

Figure 3A:
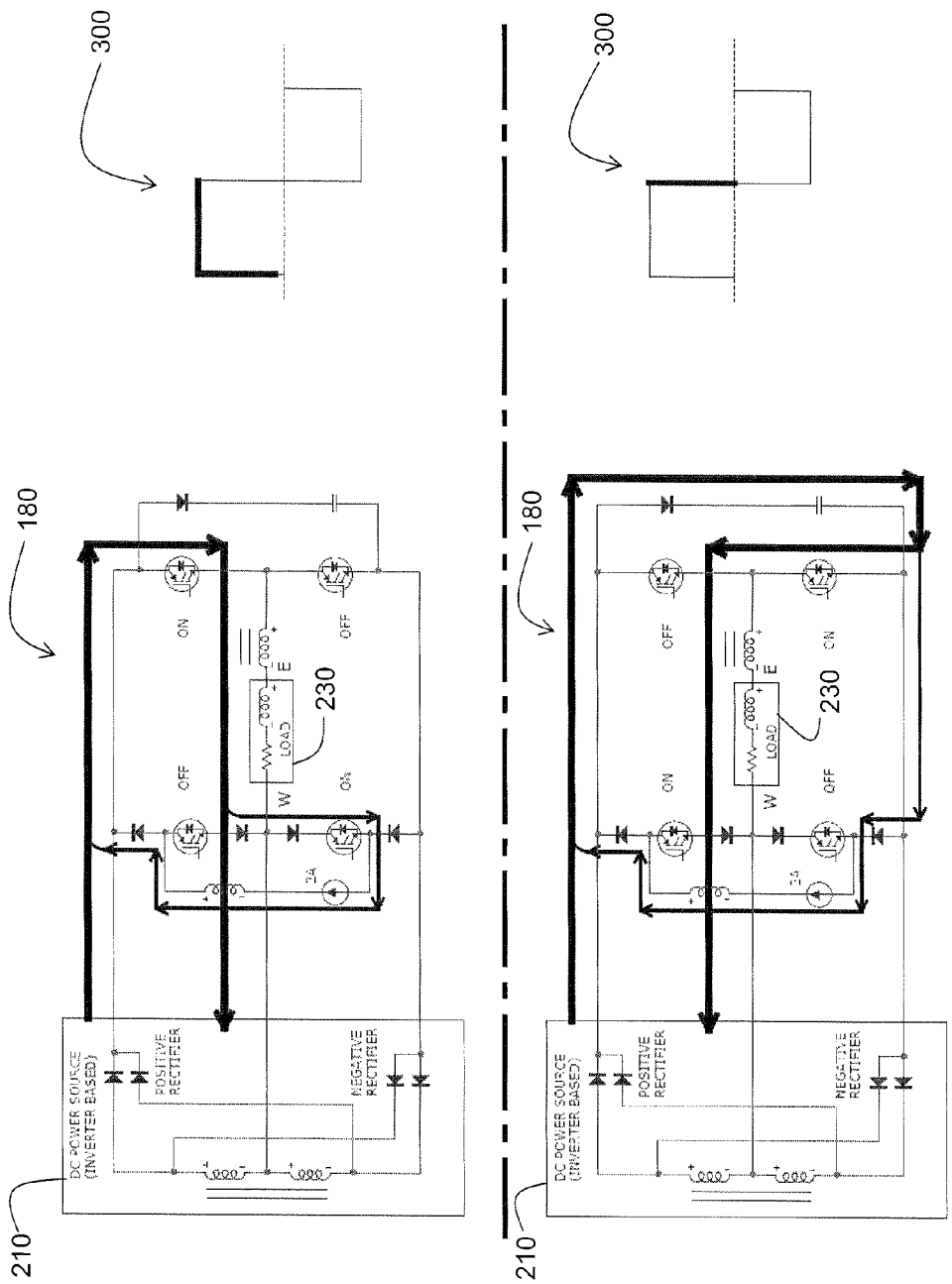
FIGS. 3A-3C illustrate the operation of the welding power source in FIG. 2 when implementing an AC welding output current waveform.
Figure 3B:
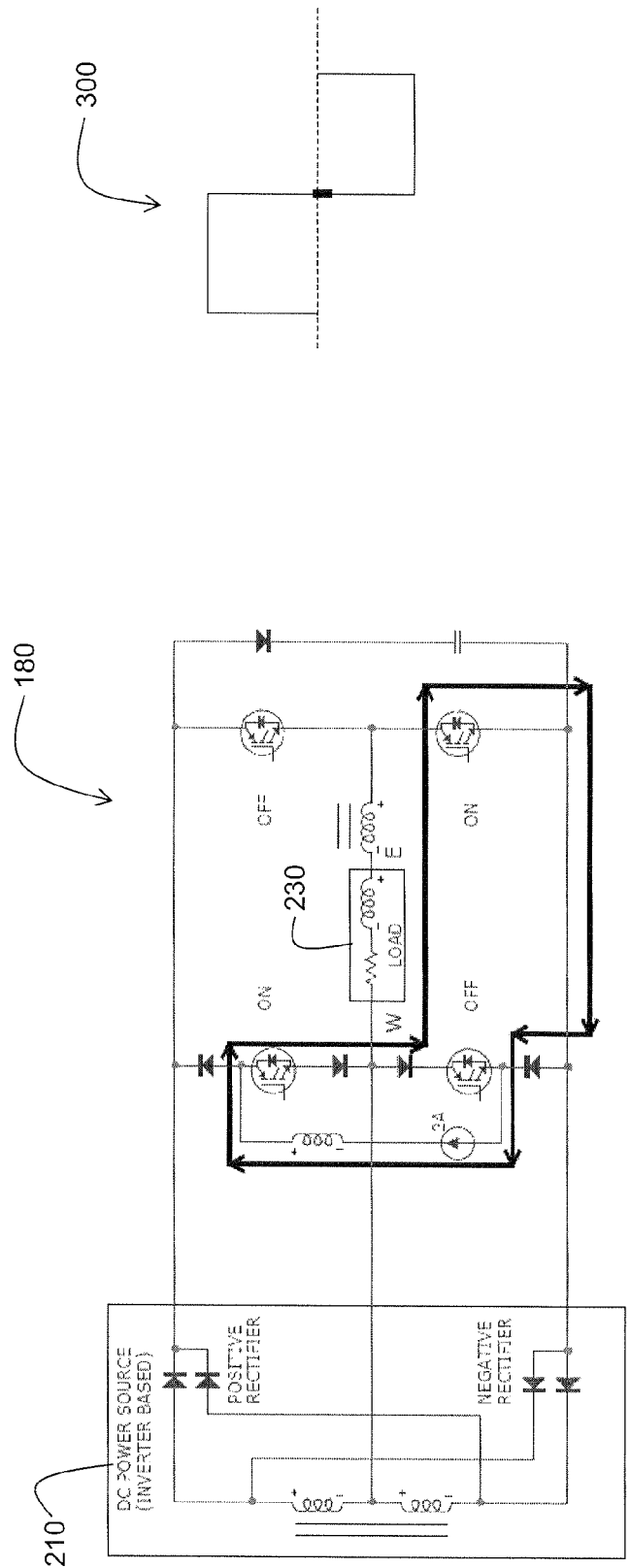
Figure 3C:
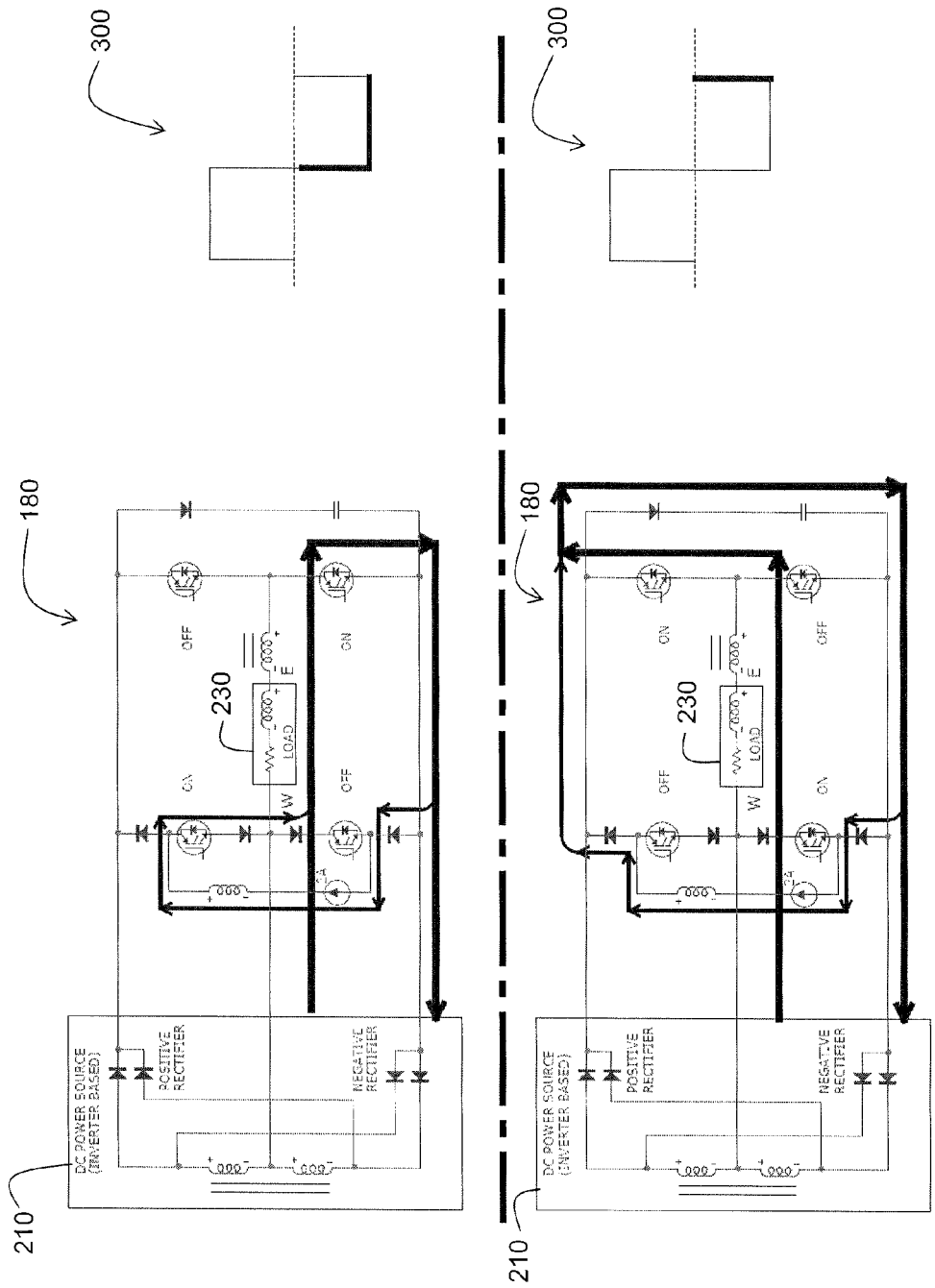

The current switching circuit 180 of FIG. 2 provides for AC welding operation and induces a voltage at the welding output of the welding power source being of sufficient magnitude to re-establish the welding arc between the electrode E and the workpiece W during polarity reversals of the welding process, as described herein with respect to FIGS. 3A-3C without the optional superposition capacitor 221. Welding output terminals 191 and 192 are shown and represent the welding output of the welding power source to which the electrode E and the workpiece W may be connected through a welding cable path.

In accordance with an embodiment, the inductor 215 has an inductance value of between about 10 to 100 milli-henries (usually much larger than the overall inductance of the welding output circuit path) and the constant current source 216 provides a constant current in the range of 2 amps to 10 amps. The constant current source 216 may be any of several different types including, for example, a chopper buck regulator or a simple voltage source and a resistor. The inductor is sized to provide a relatively stable current while inducing a large enough voltage between the electrode and the workpiece to quickly and reliably re-ignite the arc immediately after the arc goes out due to the output current switching direction (polarity reversal/switching). During zero current crossing (polarity reversal/switching), the arc extinguishes when the current reaches zero and the high voltage (e.g., 200 to 400 VDC) induced by the energy from the inductor 215 of the arc regulating circuit 170 is used to re-establish the arc in the opposite polarity. The inductor 215 keeps current flowing and induces the high voltage up to the limit set by the snubber circuit 181 (e.g., 400 VDC). The inductor 215 is capable of inducing the high voltage level in either polarity as determined by the state of the switching transistors 213 and 214 in conjunction with switching transistors 211 and 212 (i.e., when crossing the zero current point from either direction).

In accordance with an embodiment, the switching transistors and the diodes in the arc regulation circuit carry only a background current (e.g., less than 2-10 amps), and the switching transistors of the bridge circuit are shared to complete the full bridge path of the arc regulation circuit. The diodes in the arc regulation circuit block both power source current and the unintentional free-wheeling current path formed by the legs of the arc regulation circuit. The switching transistors in the arc regulation circuit may be used to form a simple boost supply that may be used to pre-charge the capacitor of the snubber circuit (with the bridge circuit OFF). Similarly the switching transistors in the arc regulation circuit may be used to pre-charge the inductor of the arc regulation circuit. In accordance with an embodiment, a 100 milli-henry inductor may be charged to 10 amps in about 20 milli-seconds (assuming a 50V differential between the arc voltage and the voltage supply for the current source). Therefore, the time to start and stabilize a GTAW process (or any other process) in DC should be more than sufficient to pre-charge the inductor of the arc regulation circuit without any additional means.

FIGS. 3A-3C illustrate the operation of the welding power source in FIG. 2 when implementing an AC welding output current waveform (e.g., represented as a simple square waveform) without the optional superposition capacitor 221. The load 230 shown in FIGS. 3A-3C represents the resistance and inductance of the arc between the electrode E and the workpiece W and the welding cable path connecting the electrode E and workpiece W to the welding power source (i.e., the welding output circuit path). The electrode E, workpiece W, and the welding cable path are not a part of the welding power source, however.

Referring to the top portion of FIG. 3A, during the positive current portion of an AC waveform 300 (see thicker dark lines of the waveform 300) produced by the welding power source, current flows predominantly from the power conversion circuit 210, through the switching transistor 211 of the bridge circuit 160, through the load 230 (in the positive direction), and back to the power conversion circuit 210 through the common path (see thick arrows). Also, a low regulated current, provided by the arc regulator circuit 170, flows from the constant current source 216, through the inductor 215 (storing energy in the inductor), through the diode 217, through the switching transistor 211 of the bridge circuit 160, through the load 230 (in the positive direction), through the diode 219 and the switching transistor 214 of the arc regulation circuit 170, and back to the constant current source 216 (see less thick arrows).

Referring to the bottom portion of FIG. 3A, during the positive current decay portion of the AC waveform 300 (see thicker dark line of the waveform 300), the load 230 effectively acts as a power source, trying to keep current flowing. Current flows from the load 230, through the power conversion circuit 210 (in a free-wheeling manner), through the active snubber circuit 181, through the anti-parallel diode of the switching transistor 212 of the bridge circuit 160, and back to the load 230 (in the positive direction, see thick arrows) until the current fully decays. Also, a low regulated current, provided by the arc regulator circuit 170, flows from the constant current source 216, through the inductor 215 (storing energy in the inductor), through the diode 217, through the snubber circuit 181, through the diode 220 of the arc regulation circuit 170, and back to the constant current source 216 (see less thick arrows). Even when current through the load 230 has fully decayed, the current from the arc regulator circuit 170 keeps flowing as described.

During current decay, the bridge circuit 160 changes polarity. However, as long as the arc current is still positive, the inductor 215 bleeds off through the high voltage path created by the snubber circuit 181. The arc regulation circuit 170 provides 2-10 amps into the snubber circuit 181. As the current through the load drops toward zero, the arc extinguishes and the arc regulation circuit applies a high voltage across the load to re-ignite the arc in the opposite polarity.

Referring to FIG. 3B, during the polarity transition portion of the AC waveform 300 (see thicker dark line of the waveform 300), no significant current is provided by the power conversion circuit 210. The arc between the electrode E and the workpiece W briefly extinguishes. However, energy stored in the inductor 215 induces an arc-igniting voltage between the electrode E and the workpiece W. Current from the power conversion circuit can begin to flow again through the load in the opposite direction. The arc current re-establishes quickly and any under-shoot or over-shoot of the welding output current is controlled by the inductor 215. Without the arc regulation circuit, the power conversion circuit would attempt to re-establish the arc. However, since the voltage provided by the power conversion circuit is usually limited (e.g., to 100 VDC), re-establishment of the arc may not occur. When, the energy from the inductor 215 of the arc regulation circuit 170 is released, current flows from the inductor 215 through the switching transistor 213, through the diode 218, through the load 230 (in the negative direction), through the switching transistor 212 of the bridge circuit 160, through the diode 220, through the constant current source 216, and back to the inductor 215 (see arrows). As a result, the arc between the electrode E and the workpiece W quickly re-ignites in the negative direction and settles to a voltage level low enough for the power source to provide current.

Referring to the top portion of FIG. 3C, during the negative current portion of the AC waveform 300 (see thicker dark lines of the waveform 300) produced by the welding power source, current flows predominantly from the power conversion circuit 210, through the load 230 (in the negative direction), through the switching transistor 212 of the bridge circuit 160, and back to the power conversion circuit 210 (see thick arrows). Also, a low regulated current, provided by the arc regulator circuit 170, flows from the constant current source 216, through the inductor 215 (storing energy in the inductor), through the switching transistor 213, through the diode 218, through the load 230 (in the negative direction), through the switching transistor 212 of the bridge circuit 160, through the diode 220 of the arc regulation circuit 170, and back to the constant current source 216 (see less thick arrows).

Referring to the bottom portion of FIG. 3C, during the negative current decay portion of the AC waveform 300 (see thicker dark line of the waveform 300), the load 230 effectively acts as a power source, trying to keep current flowing. Current flows from the load 230, through the anti-parallel diode of the switching transistor 211 of the bridge circuit 160, through the active snubber circuit 181, through the power conversion circuit 210 (in a free-wheeling manner), and back to the load 230 (see thick arrows). Also, a low regulated current, provided by the arc regulator circuit 170, flows from the constant current source 216, through the inductor 215 (storing energy in the inductor), through the diode 217, through the snubber circuit 181, through the diode 220 of the arc regulation circuit 170, and back to the constant current source 216 (see less thick arrows). Even when current through the load 230 has fully decayed, the current from the arc regulator circuit 170 keeps flowing as described.

Upon making the transition back to the positive portion of the waveform 300 (i.e., the waveform is repeating), in a similar manner to that of FIG. 3B, the inductor 215 will release its stored energy through the load (but in the positive direction) via the diode 217, the switching transistor 211, the diode 219, the switching transistor 214, and the constant current source 216, causing the arc between the electrode E and the workpiece W to quickly re-ignite in the positive direction. The arc regulation circuit 170 continuously adds a well-regulated low value of current to the welding output current provided by the power source to stabilize the arc as the current provided by the power conversion circuit decreases toward zero, and to immediately re-ignite the arc in the opposite polarity.

Figure 4:
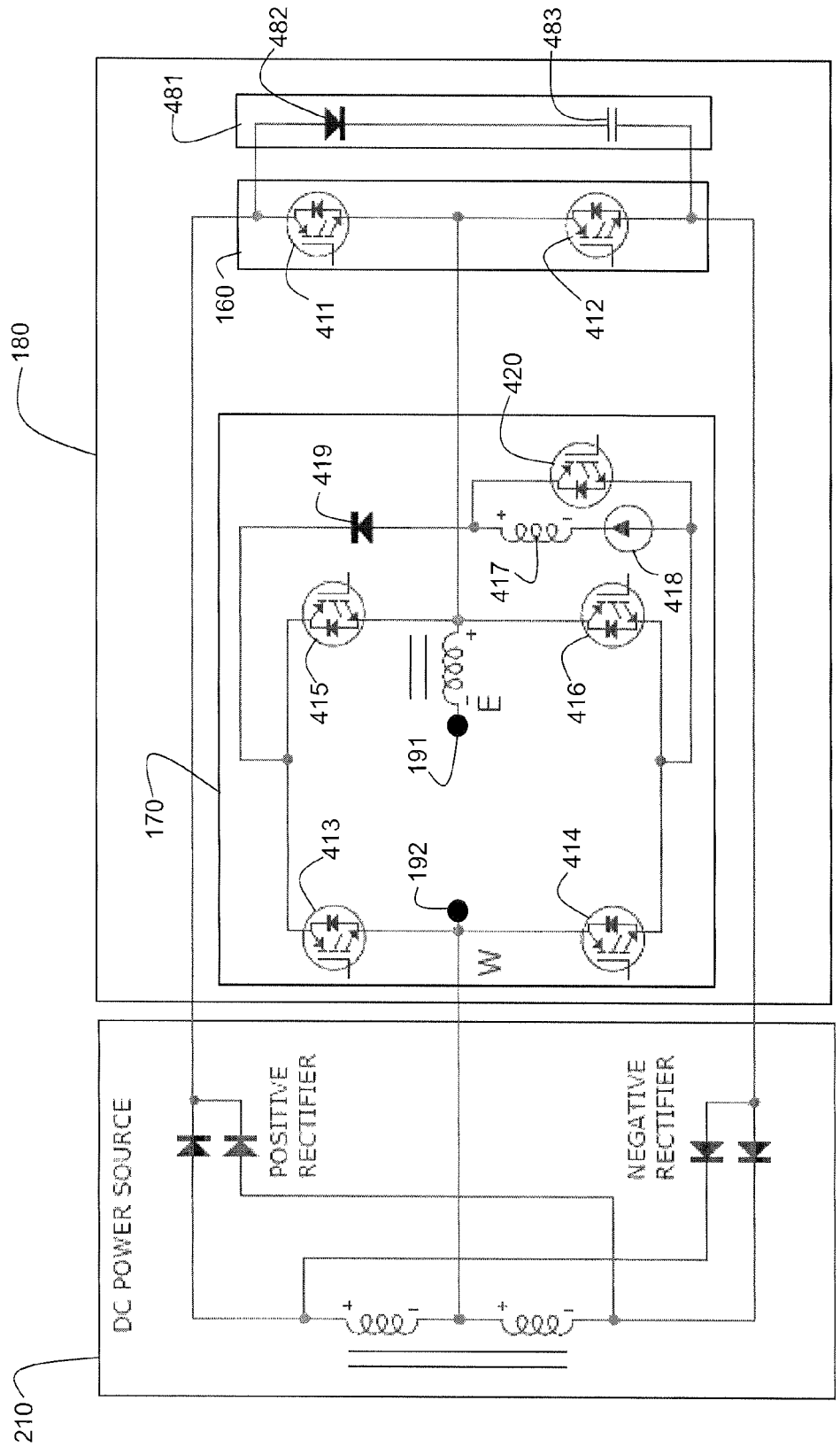
FIG. 4 illustrates a schematic diagram of a second exemplary embodiment of a portion of the welding power source of FIG. 1 having a bridge circuit and a bi-polar arc regulation circuit.

FIG. 4 illustrates a schematic diagram of a second exemplary embodiment of a portion of the welding power source 100 of FIG. 1 having a bridge circuit 160 and a bi-polar arc regulation circuit 170. Also illustrated in FIG. 4 is a portion 210 of the power conversion circuit 110, where the power conversion circuit 110 is a center-tapped or half bridge topology (e.g., an inverter-based circuit). The current switching circuit 180 of FIG. 4 is in the form of a half bridge topology where the power conversion circuit 110 provides dual output current paths configured to share a common path, such that each output path can induce a flow of opposite polarity in the shared path. The operation of the welding power source portion of FIG. 4 is similar to that of FIG. 2. However, FIG. 4 provides a full bridge arc regulation circuit 170 having four switching transistors, resulting in a slightly more sophisticated implementation that may provide improved low current regulation and arc ignition performance over the configuration of FIG. 2.

The bridge circuit 160 includes switching transistors 411 and 412. The arc regulating circuit 170 includes switching transistors 413, 414, 415, and 416, inductor 417, constant current source 418, diode 419 and, optionally, pre-charge switching transistor 420. In accordance with an embodiment, the switching transistors are insulated gate bipolar transistors (IGBTs). However, other types of switching transistors may be used as well (e.g., metal-oxide semiconductor field effect transistors or MOSFETs), in accordance with other embodiments. An active snubber circuit 481, having a diode 482 and a capacitor 483, is used to limit the voltage across the current switching circuit 180 (e.g., somewhere between 300 V and 600 V) to cause the output current through the output circuit path to decay quickly and bound or limit the arc re-ignition voltage level. The anti-parallel diodes of the switching transistors 411 and 412 carry the snubber/decay current. The optional pre-charge switching transistor 420 of the arc regulation circuit 170 may be used to pre-charge the inductor 417 with energy. When the pre-charge transistor 420 is on, current from the inductor 417 flows through the pre-charge transistor 420. As an alternative option, pre-charging of the inductor may be accomplished by shorting across the transistors of the arc regulation circuit 170 (e.g., 413 and 414, or 415 and 416). Pre-charging of the inductor may be desired such that the inductor has stored energy and is ready to perform initial arc ignition functions (at the start of the welding process) or arc re-ignition functions (at zero crossings) more quickly.

The current switching circuit 180 of FIG. 4 provides for AC welding operation and induces a voltage at the welding output of the welding power source being of sufficient magnitude to re-establish the welding arc between the electrode E and the workpiece W during polarity reversals of the welding process. Welding output terminals 191 and 192 are shown and represent the welding output of the welding power source to which the electrode E and the workpiece W may be connected through a welding cable path.

In accordance with an embodiment, the inductor 417 has an inductance value of between about 10 to 100 milli-henries and the constant current source 418 provides a constant current in the range of 2 amps to 10 amps. The constant current source 418 may be any of several different types including, for example, a chopper buck regulator or a simple voltage source and a resistor. The inductor is sized to provide a relatively stable current while inducing a large enough voltage between the electrode and the workpiece to quickly and reliably re-ignite the arc immediately after the arc goes out due to the output current switching direction (polarity reversal/switching).

During zero current crossing (polarity reversal/switching) the arc extinguishes and the high voltage induced by the energy from the inductor 417 of the arc regulating circuit 170 is used to re-establish the arc in the opposite polarity. The inductor 417 keeps current flowing and induces the high voltage up to the limit set by the snubber circuit 481 (e.g., 400 VDC). The inductor 417 induces the high voltage level in either polarity as determined by the state of the switching transistors (i.e., when crossing the zero current point from either direction).

Figure 5:
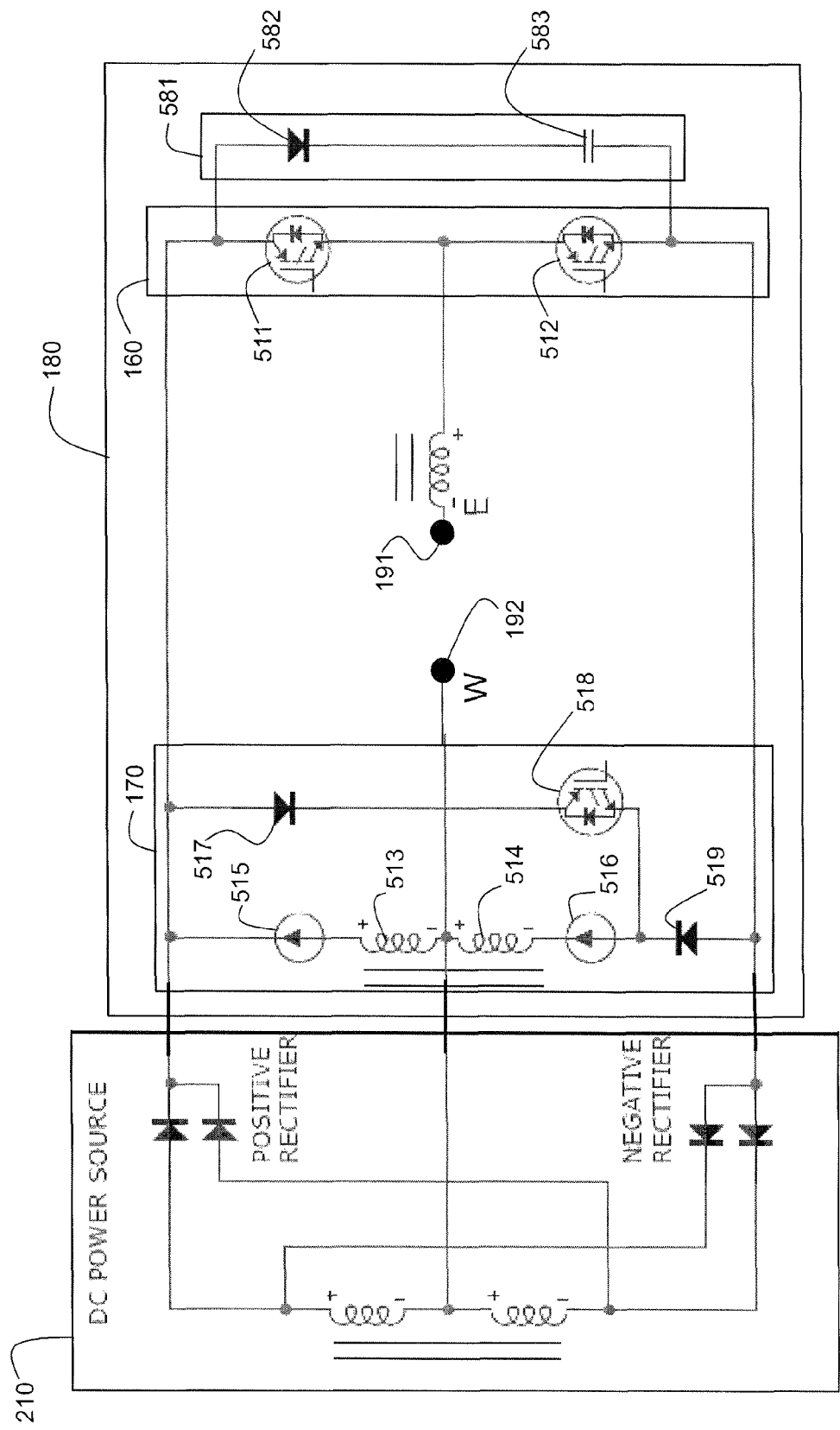
FIG. 5 illustrates a schematic diagram of a third exemplary embodiment of a portion of the welding power source of FIG. 1 having a bridge circuit and a bi-polar arc regulation circuit.

FIG. 5 illustrates a schematic diagram of a third exemplary embodiment of a portion of the welding power source 100 of FIG. 1 having a bridge circuit 160 and a bi-polar arc regulation circuit 170. Also illustrated in FIG. 5 is a portion 210 of the power conversion circuit 110, where the power conversion circuit 110 is a center-tapped or half bridge topology (e.g., an inverter-based circuit). The current switching circuit 180 of FIG. 5 is in the form of a half bridge topology where the power conversion circuit 110 provides dual output current paths configured to share a common path, such that each output path can induce a flow of opposite polarity in the shared path. The operation of the welding power source portion of FIG. 5 is similar to that of FIG. 2. However, FIG. 5 provides a dual arc regulation circuit 170 having two coupled inductors and two constant current sources, resulting in a more sophisticated implementation that may provide improved low current regulation and arc regulation performance over the configuration of FIG. 2.

The bridge circuit 160 includes switching transistors 511 and 512. The arc regulating circuit 170 includes coupled inductors 513 and 514, constant current sources 515 and 516, diodes 517 and 519 and, optionally, pre-charge switching transistor 518. In accordance with an embodiment, the switching transistors are insulated gate bipolar transistors (IGBTs). However, other types of switching transistors may be used as well (e.g., metal-oxide semiconductor field effect transistors or MOSFETs), in accordance with other embodiments. An active snubber circuit 581, having a diode 582 and a capacitor 583, is used to limit the voltage across the current switching circuit 180 (e.g., somewhere between 300 V and 600 V) to cause the output current through the output circuit path to decay quickly and to limit or bound the arc re-ignition voltage level. The anti-parallel diodes of the switching transistors 511 and 512 carry the snubber/decay current. The optional pre-charge switching transistor 518 of the arc regulation circuit 170 may be used to pre-charge the inductors 513 and 514 with energy. When the pre-charge transistor 518 is on, current from the inductors flows through the pre-charge transistor. As an alternative, pre-charging may be performed by shorting across the switching transistors. Pre-charging of the inductors may be desired such that the inductors have stored energy and are ready to perform initial arc ignition functions (at the start of the welding process) or arc re-ignition functions (at zero crossings) more quickly.

The current switching circuit 180 of FIG. 5 provides for AC welding operation and induces a voltage at the welding output of the welding power source being of sufficient magnitude to re-establish the welding arc between the electrode E and the workpiece W during polarity reversals of the welding process. Welding output terminals 191 and 192 are shown and represent the welding output of the welding power source to which the electrode E and the workpiece W may be connected through a welding cable path.

In accordance with an embodiment, the inductors 513 and 514 each have an inductance value of between about 10 to 100 milli-henries and the constant current sources 515 and 516 each provide a constant current in the range of 2 amps to 10 amps. The constant current sources 515 and 516 may be any of several different types including, for example, a chopper buck regulator or a simple voltage source and a resistor. The inductors are sized to induce a large enough voltage between the electrode and the workpiece to quickly and reliably re-ignite the arc immediately after the arc goes out due to the output current switching direction (polarity reversal/switching).

During zero current crossing (polarity reversal/switching), the arc extinguishes and the high voltage induced by the energy from a corresponding inductor of the arc regulating circuit 170 is used to re-establish the arc in the opposite polarity. The inductors keep current flowing and induce the high voltage up to the limit set by the snubber circuit 581 (e.g., 400 VDC). The inductors induce the high voltage level in either polarity as determined by the state of the switching transistors (i.e., when crossing the zero current point from either direction).

Figure 6:
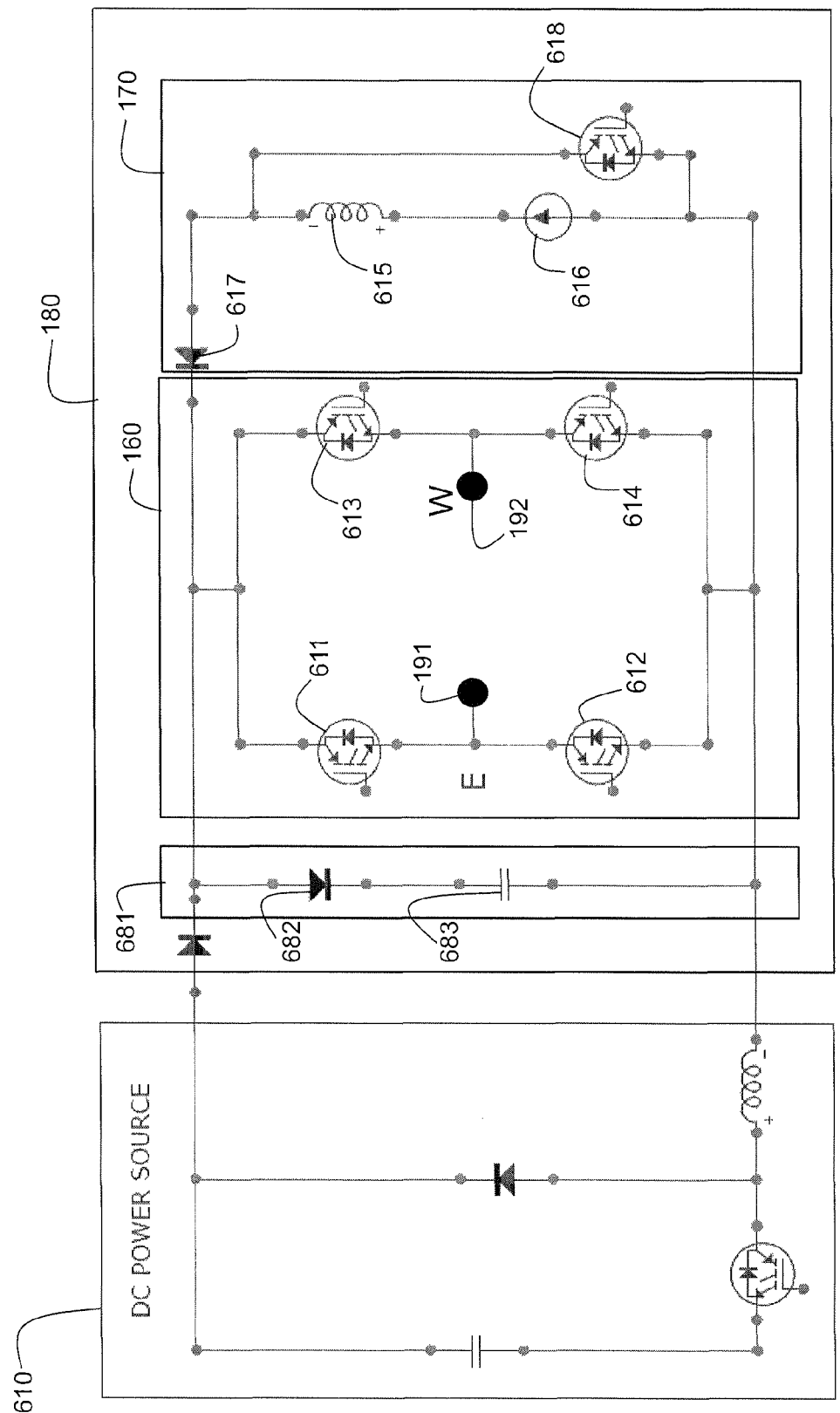
FIG. 6 illustrates a schematic diagram of a fourth exemplary embodiment of a portion of the welding power source of FIG. 1 having a bridge circuit and a bi-polar arc regulation circuit.

FIG. 6 illustrates a schematic diagram of a fourth exemplary embodiment of a portion of the welding power source 100 of FIG. 1 having a bridge circuit 160 and a bi-polar arc regulation circuit 170. Also illustrated in FIG. 6 is a portion 610 of the power conversion circuit 110, where the power conversion circuit 110 provides a DC+output (e.g., a chopper-based circuit). The current switching circuit 180 of FIG. 6 is in the form of a full bridge topology that may be used with almost any power source topology, providing flexibility and the potential to be added to existing designed power sources. FIG. 6 provides a shared H-bridge switching topology, resulting in an implementation that may provide improved low current regulation and arc re-ignition performance over that of the configuration of FIG. 2.

The bridge circuit 160 includes switching transistors 611, 612, 613, and 614, forming a full H-bridge configuration. The arc regulating circuit 170 includes an inductor 615, a constant current source 616, diode 617 and, optionally, pre-charge switching transistor 618. In accordance with an embodiment, the switching transistors are insulated gate bipolar transistors (IGBTs). However, other types of switching transistors may be used as well (e.g., metal-oxide semiconductor field effect transistors or MOSFETs), in accordance with other embodiments. An active snubber circuit 681, having a diode 682 and a capacitor 683, is used to limit the voltage across the current switching circuit 180 (e.g., somewhere between 300 V and 600 V) to cause the output current through the output circuit path to decay quickly and to limit or bound the arc re-ignition voltage. The anti-parallel diodes of the switching transistors 611-614 carry the snubber/decay current. The optional pre-charge switching transistor 618 of the arc regulation circuit 170 may be used to pre-charge the inductor 615 with energy. When the pre-charge transistor 618 is on, current from the inductor flows through the pre-charge transistor. Again, as an alternative, pre-charging may be performed by shorting across the switching transistors. Pre-charging of the inductor may be desired such that the inductor has stored energy and is ready to perform initial arc ignition functions (at the start of the welding process) or arc re-ignition functions (at zero crossings) more quickly.

The current switching circuit 180 of FIG. 6 provides for AC welding operation and induces a voltage at the welding output of the welding power source being of sufficient magnitude to re-establish the welding arc between the electrode E and the workpiece W during polarity reversals of the welding process. Welding output terminals 191 and 192 are shown and represent the welding output of the welding power source to which the electrode E and the workpiece W may be connected through a welding cable path.

In accordance with an embodiment, the inductor 615 has an inductance value of between about 10 to 100 milli-henries and the constant current source 616 provides a constant current in the range of 2 amps to 10 amps. The constant current source 616 may be any of several different types including, for example, a chopper buck regulator or a simple voltage source and a resistor. The inductor is sized to provide a relatively stable current while inducing a large enough voltage between the electrode and the workpiece to quickly and reliably re-ignite the arc immediately after the arc goes out due to the output current switching direction (polarity reversal/switching).

During zero current crossing (polarity reversal/switching) the arc extinguishes and the high voltage induced by the energy from the inductor of the arc regulating circuit 170 is used to re-establish the arc in the opposite polarity. The inductor keeps current flowing and induces the high voltage up to the limit set by the snubber circuit 681 (e.g., 400 VDC). The inductor induces the high voltage level in either polarity as determined by the state of the switching transistors (i.e., when crossing the zero current point from either direction).

In accordance with some embodiments, the arc regulation circuit stores energy and releases the stored energy as an additional surge to facilitate re-ignition of the arc. The additional surge may be provided on polarity transitions in both directions, or may be limited to only one direction of the polarity transition, such as the negative to positive transition which has typically been more difficult to establish. In FIGS. 7-9, those components in common with FIGS. 2-3 are identified by the same reference numbers in the discussion below but in some instances are omitted from FIGS. 7-9 to maintain the clarity of figures.

Figure 7A:
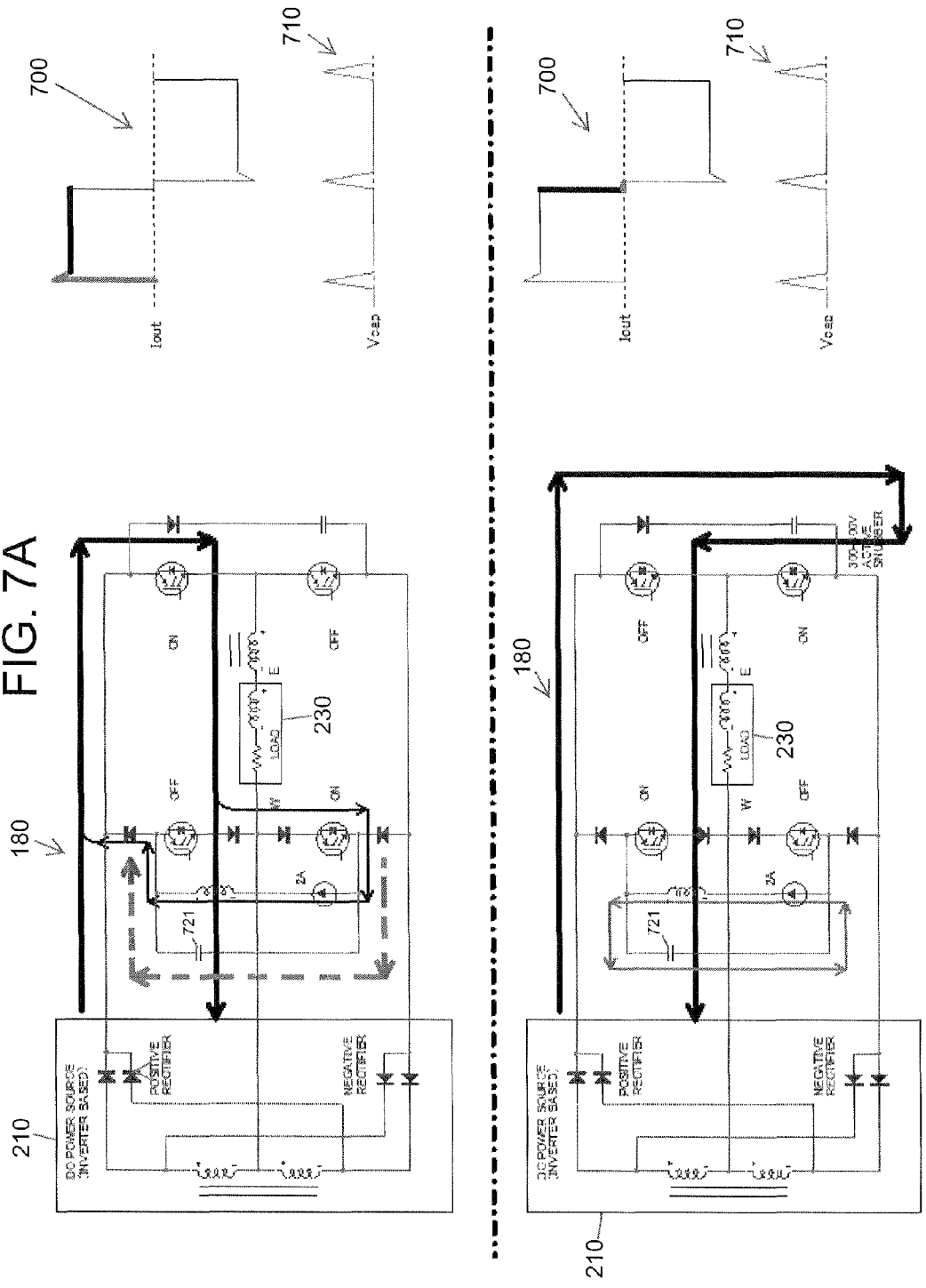

FIGS. 7A-7B illustrate the operation of the welding power source in FIG. 2 when implementing an AC welding output current waveform (e.g., represented as a simple square waveform) including the use of the optional superposition capacitor 721. The arc regulation circuit 170 including the superposition capacitor 721 as described in FIGS. 7A-7B charges the superposition capacitor during the pre-defined deadtime between polarities and releases the energy to the load when the bridge circuit 160 is turned back on in either polarity. The output current 700 and capacitor voltage 710 are illustrated during the operation of the welding power source as described below.

The load 230 shown in FIGS. 7A-7B represents the resistance and inductance of the arc between the electrode E and the workpiece W and the welding cable path connecting the electrode E and workpiece W to the welding power source (i.e., the welding output circuit path). The electrode E, workpiece W, and the welding cable path are not a part of the welding power source, however.

Referring to the top portion of FIG. 7A, during the positive current portion of an AC waveform 700 (see thicker dark lines of the waveform 700) produced by the welding power source, current flows predominantly from the power conversion circuit 210, through the switching transistor 211 of the bridge circuit 160, through the load 230 (in the positive direction), and back to the power conversion circuit 210 through the common path (see thick arrows). Also, a low regulated current, provided by the arc regulator circuit 170, flows from the constant current source 216, through the inductor 215 (storing energy in the inductor), through the diode 217, through the switching transistor 211 of the bridge circuit 160, through the load 230 (in the positive direction), through the diode 219 and the switching transistor 214 of the arc regulation circuit 170, and back to the constant current source 216 (see less thick arrows). In addition, the superposition capacitor 721 discharges to provide additional current through the diode 217, through the switching transistor 211 of the bridge circuit 160, through the load (in the positive direction), through the diode 219 and the switching transistor 214 of the arc regulation circuit 170 and back to the superposition capacitor 721 (see dashed line arrows). The discharge of the superposition capacitor 721 provides an initial surge in the output current as the output current transitions to the positive direction to establish or reestablish the arc. The capacitor is already charged from the deadtime preceding the pulse. During the re-establishment, the positive rectifier of 210 is reverse biased by the voltage stored in the capacitor. Therefore, current to the arc flows from the capacitor and the remaining energy stored in the low current background circuit inductor 215. The superposition capacitor provides the initial surge (limited only by the arc impedance) depicted in the waveform diagram in FIG. 7A. Once the capacitor voltage decays below the maximum output voltage of the power source 210, the positive rectifier again forward biases, and the power source can once again supply the arc current.

Referring to the bottom portion of FIG. 7A, during the positive current decay portion of the AC waveform 700 (see thicker dark line of the waveform 700), the load 230 effectively acts as a power source, trying to keep current flowing. Current flows from the load 230, through the power conversion circuit 210 (in a free-wheeling manner), through the active snubber circuit 181, through the anti-parallel diode of the switching transistor 212 of the bridge circuit 160, and back to the load 230 (in the positive direction, see thick arrows) until the current fully decays. Also, a low regulated current, provided by the arc regulator circuit 170, flows from the constant current source 216, through the inductor 215, through the superposition capacitor 721 (charging the capacitor), and back to the constant current source 216 (see dashed line arrows). Energy is already stored in the inductor 215. Once the superposition capacitor voltage exceeds the maximum supply voltage of the current source, it is the energy in the inductor that continues to charge the capacitor (all the while decaying as it gives up its energy to the capacitor). Even when current through the load 230 has fully decayed, the current from the arc regulator circuit 170 keeps flowing as described to charge the superposition capacitor 721 during the deadtime of the polarity change. The deadtime during the polarity change may be adjusted to provide the desired charge to the superposition capacitor.

During current decay, the bridge circuit 160 changes polarity. As the current through the load drops toward zero, the arc extinguishes and the arc regulation circuit with the superposition capacitor applies a high voltage across the load to re-ignite the arc in the opposite polarity.

Referring to the top portion of FIG. 7B, during the polarity transition portion of the AC waveform 700 (see thicker dark line of the waveform 700), no significant current is provided by the power conversion circuit 210. The arc between the electrode E and the workpiece W briefly extinguishes. However, the energy stored in the inductor 215 and the energy stored in the superposition capacitor 721 combine to induce an arc-igniting voltage between the electrode E and the workpiece W. Once re-ignition occurs, the energy stored in the superposition capacitor is applied to the arc to create a low impedance plasma. Once the arc voltage drops below the maximum output voltage of the power source 210, the negative rectifier again forward biases, and the power source can once again supply the arc current. Current from the power conversion circuit can begin to flow again through the load in the opposite direction. Without the arc regulation circuit, the power conversion circuit would attempt to re-establish the arc. However, since the voltage provided by the power conversion circuit is usually limited (e.g., to 100 VDC), re-establishment of the arc may not occur. When, the energy from the inductor 215 and the superposition capacitor 721 of the arc regulation circuit 170 is released, current flows from the inductor 215 and the superposition capacitor 721 through the switching transistor 213, through the diode 218, through the load 230 (in the negative direction), through the switching transistor 212 of the bridge circuit 160, through the diode 220, back to the capacitor 721 and through the constant current source 216 back to the inductor 215 (see arrows). The discharge of the superposition capacitor 721 provides an initial surge in the output current as the output current transitions to the negative direction to establish or reestablish the arc. As a result, the arc between the electrode E and the workpiece W quickly re-ignites in the negative direction and settles to a voltage level low enough for the power source to provide current.

Referring still to the top portion of FIG. 7B, during the negative current portion of the AC waveform 700 (see thicker dark lines of the waveform 700) produced by the welding power source, current flows predominantly from the power conversion circuit 210, through the load 230 (in the negative direction), through the switching transistor 212 of the bridge circuit 160, and back to the power conversion circuit 210 (see thick arrows). Also, a low regulated current, provided by the arc regulator circuit 170, flows from the constant current source 216, through the inductor 215 (storing energy in the inductor), through the switching transistor 213, through the diode 218, through the load 230 (in the negative direction), through the switching transistor 212 of the bridge circuit 160, through the diode 220 of the arc regulation circuit 170, and back to the constant current source 216 (see less thick arrows). In addition, the superposition capacitor 721 discharges to provide additional current through the switching transistor 213, through the diode 218, through the load 230 (in the negative direction), through the switching transistor 212 of the bridge circuit 160, through the diode 220 of the arc regulation circuit 170, and back to the superposition capacitor 721 (see dashed line arrows), and occurs during the initial portion of the half-wave until the energy in the capacitor is depleted (discharged).

Referring to the bottom portion of FIG. 7B, during the negative current decay portion of the AC waveform 700 (see thicker dark line of the waveform 700), the load 230 effectively acts as a power source, trying to keep current flowing. Current flows from the load 230, through the anti-parallel diode of the switching transistor 211 of the bridge circuit 160, through the active snubber circuit 181, through the power conversion circuit 210 (in a free-wheeling manner), and back to the load 230 (see thick arrows). Also, a low regulated current, provided by the arc regulator circuit 170, flows from the constant current source 216, through the inductor 215, through the superposition capacitor 721 (charging the capacitor), back to the constant current source 216 (see dashed line arrows). The energy is already stored in the inductor 215. Once the superposition capacitor voltage exceeds the maximum supply voltage of the current source, it is the energy in the inductor that continues to charge the capacitor (all the while decaying as it gives up its energy to the capacitor). Even when current through the load 230 has fully decayed, the current from the arc regulator circuit 170 keeps flowing as described to charge the superposition capacitor 721 during the deadtime of the polarity change. The deadtime during the polarity changes may be adjusted to provide adequate charging of the superposition capacitor.

Upon making the transition back to the positive portion of the waveform 700 (i.e., the waveform is repeating), as described above for FIG. 7A, the inductor 215 and the superposition capacitor 721 will both release the stored energy through the load (but in the positive direction) via the diode 217, the switching transistor 211, the diode 219, the switching transistor 214, and the constant current source 216, causing the arc between the electrode E and the workpiece W to quickly re-ignite in the positive direction. The arc regulation circuit 170 continuously adds a well-regulated low value of current to the welding output current provided by the power source to stabilize the arc as the current provided by the power conversion circuit decreases toward zero, and to immediately re-ignite the arc in the opposite polarity after the prescribed deadtime by releasing the energy stored in both the inductor and the superposition capacitor.

FIGS. 8A-8B illustrate the operation of another embodiment of a welding power source when implementing an AC welding output current waveform (e.g., represented as a simple square waveform) including the use of a superposition capacitor 821 connected to the cathode of diode 217. The arc regulation circuit 170 including the superposition capacitor 821 as illustrated in FIGS. 8A-8B charges the superposition capacitor during the predefined deadtime between polarities and releases the energy to the load during the negative to positive transition, which has traditionally been the most difficult to reestablish. Charging twice and discharging once per cycle may reduce the deadtime required per cycle to charge the superposition capacitor while increasing the stored energy available to reignite the arc during the negative to positive transition. The output current 800 and capacitor voltage 810 are illustrated during the operation of the welding power source as described below.

The load 230 shown in FIGS. 8A-8B represents the resistance and inductance of the arc between the electrode E and the workpiece W and the welding cable path connecting the electrode E and workpiece W to the welding power source (i.e., the welding output circuit path). The electrode E, workpiece W, and the welding cable path are not a part of the welding power source, however.

Referring to the top portion of FIG. 8A, during the positive current portion of an AC waveform 800 (see thicker dark lines of the waveform 800) produced by the welding power source, current flows predominantly from the power conversion circuit 210, through the switching transistor 211 of the bridge circuit 160, through the load 230 (in the positive direction), and back to the power conversion circuit 210 through the common path (see thick arrows). Also, a low regulated current, provided by the arc regulator circuit 170, flows from the constant current source 216, through the inductor 215 (storing energy in the inductor), through the diode 217, through the switching transistor 211 of the bridge circuit 160, through the load 230 (in the positive direction), through the diode 219 and the switching transistor 214 of the arc regulation circuit 170, and back to the constant current source 216 (see less thick arrows). In addition, the superposition capacitor 821 discharges to provide additional current to the positive bus through the switching transistor 211 of the bridge circuit 160, through the load (in the positive direction), through the diode 219 and the switching transistor 214 of the arc regulation circuit 170 and back to the superposition capacitor 821 (see dashed line arrows). The discharge of the superposition capacitor 821 provides an initial surge in the output current 800 as the output current transitions to the positive direction to establish or reestablish the arc. The capacitor is already charged from the deadtime preceding the pulse. During the re-establishment, the positive rectifier of 210 is reverse biased by the voltage stored in the capacitor. Therefore, current to the arc flows from the capacitor and the remaining energy stored in the low current background circuit inductor 215. The superposition capacitor provides the initial surge (limited only by the arc impedance) depicted in the waveform diagram in FIG. 8A. Once the capacitor voltage decays below the maximum output voltage of the power source 210, the positive rectifier again forward biases, and the power source can once again supply the arc current.

Referring to the bottom portion of FIG. 8A, during the positive current decay portion of the AC waveform 800 (see thicker dark line of the waveform 800), the load 230 effectively acts as a power source, trying to keep current flowing. Current flows from the load 230, through the power conversion circuit 210 (in a free-wheeling manner), through the active snubber circuit 181, through the anti-parallel diode of the switching transistor 212 of the bridge circuit 160, and back to the load 230 (in the positive direction, see thick arrows) until the current fully decays. Also, a low regulated current, provided by the arc regulator circuit 170, flows from the constant current source 216, through the inductor 215, through diode 217, through the superposition capacitor 821 (charging the capacitor), and back to the constant current source 216 (see dashed line arrows). Energy is already stored in the inductor 215. Once the superposition capacitor voltage exceeds the maximum supply voltage of the current source, it is the energy in the inductor that continues to charge the capacitor (all the while decaying as it gives up its energy to the capacitor). Even when current through the load 230 has fully decayed, the current from the arc regulator circuit 170 keeps flowing as described to charge the superposition capacitor 821 during the deadtime of the polarity change. The deadtime during the polarity change may be adjusted to provide the desired charge to the superposition capacitor.

During current decay, the bridge circuit 160 changes polarity. As the current through the load drops toward zero, the arc extinguishes and the inductor of the arc regulation circuit applies a high voltage across the load to re-ignite the arc in the opposite polarity.

Referring to the top portion of FIG. 8B, during the polarity transition portion of the AC waveform 800 (see thicker dark line of the waveform 800), no significant current is provided by the power conversion circuit 210. The arc between the electrode E and the workpiece W briefly extinguishes. However, energy stored in the inductor 215 induces an arc-igniting voltage between the electrode E and the workpiece W. Current from the power conversion circuit can begin to flow again through the load in the opposite direction. Undershoot at the arc is limited by the inductor. Overshoot is not limited by the inductor since not all of the arc current flows through the inductor. Without the arc regulation circuit, the power conversion circuit would attempt to re-establish the arc. However, since the voltage provided by the power conversion circuit is usually limited (e.g., to 100 VDC), re-establishment of the arc may not occur. When, the energy from the inductor 215 of the arc regulation circuit 170 is released, current flows from the inductor 215 through the switching transistor 213, through the diode 218, through the load 230 (in the negative direction), through the switching transistor 212 of the bridge circuit 160, through the diode 220, through the constant current source 216, and back to the inductor 215 (see arrows). As a result, the arc between the electrode E and the workpiece W quickly re-ignites in the negative direction and settles to a voltage level low enough for the power source to provide current. The superposition capacitor 821 connected to the cathode of diode 217 does not discharge as the output current transitions to the negative direction to establish or reestablish the arc allowing the superposition capacitor 821 to retain the energy stored during the deadtime during the polarity transition.

Referring still to the top portion of FIG. 8B, during the negative current portion of the AC waveform 800 (see thicker dark lines of the waveform 800) produced by the welding power source, current flows predominantly from the power conversion circuit 210, through the load 230 (in the negative direction), through the switching transistor 212 of the bridge circuit 160, and back to the power conversion circuit 210 (see thick arrows). Also, a low regulated current, provided by the arc regulator circuit 170, flows from the constant current source 216, through the inductor 215 (storing energy in the inductor), through the switching transistor 213, through the diode 218, through the load 230 (in the negative direction), through the switching transistor 212 of the bridge circuit 160, through the diode 220 of the arc regulation circuit 170, and back to the constant current source 216 (see less thick arrows). The superposition capacitor 821 does not discharge during the negative current portion of the AC waveform 800 and retains the energy stored as illustrated by the capacitor voltage waveform 810.

Referring to the bottom portion of FIG. 8B, during the negative current decay portion of the AC waveform 800 (see thicker dark line of the waveform 800), the load 230 effectively acts as a power source, trying to keep current flowing. Current flows from the load 230, through the anti-parallel diode of the switching transistor 211 of the bridge circuit 160, through the active snubber circuit 181, through the power conversion circuit 210 (in a free-wheeling manner), and back to the load 230 (see thick arrows). Also, a low regulated current, provided by the arc regulator circuit 170, flows from the constant current source 216, through the inductor 215, through the diode 217, through the superposition capacitor 821 (charging the capacitor), back to the constant current source 216 (see less thick arrows). Energy is already stored in the inductor. Once the superposition capacitor voltage exceeds the maximum supply voltage of the current source, it is the energy in the inductor that continues to charge the capacitor (all the while decaying as it gives up its energy to the capacitor). Even when current through the load 230 has fully decayed, the current from the arc regulator circuit 170 keeps flowing as described to charge the superposition capacitor 821 during the deadtime of the polarity change. The deadtime during the polarity changes may be adjusted to provide adequate charging of the superposition capacitor.

Upon making the transition back to the positive portion of the waveform 800 (i.e., the waveform is repeating), as described above for FIG. 8A, the inductor 215 and the superposition capacitor 821 will release stored energy through the load (but in the positive direction) causing the arc between the electrode E and the workpiece W to quickly re-ignite in the positive direction. The arc regulation circuit 170 continuously adds a well-regulated low value of current to the welding output current provided by the power source to stabilize the arc as the current provided by the power conversion circuit decreases toward zero, and to immediately re-ignite the arc in the opposite polarity.

Figure 9C:
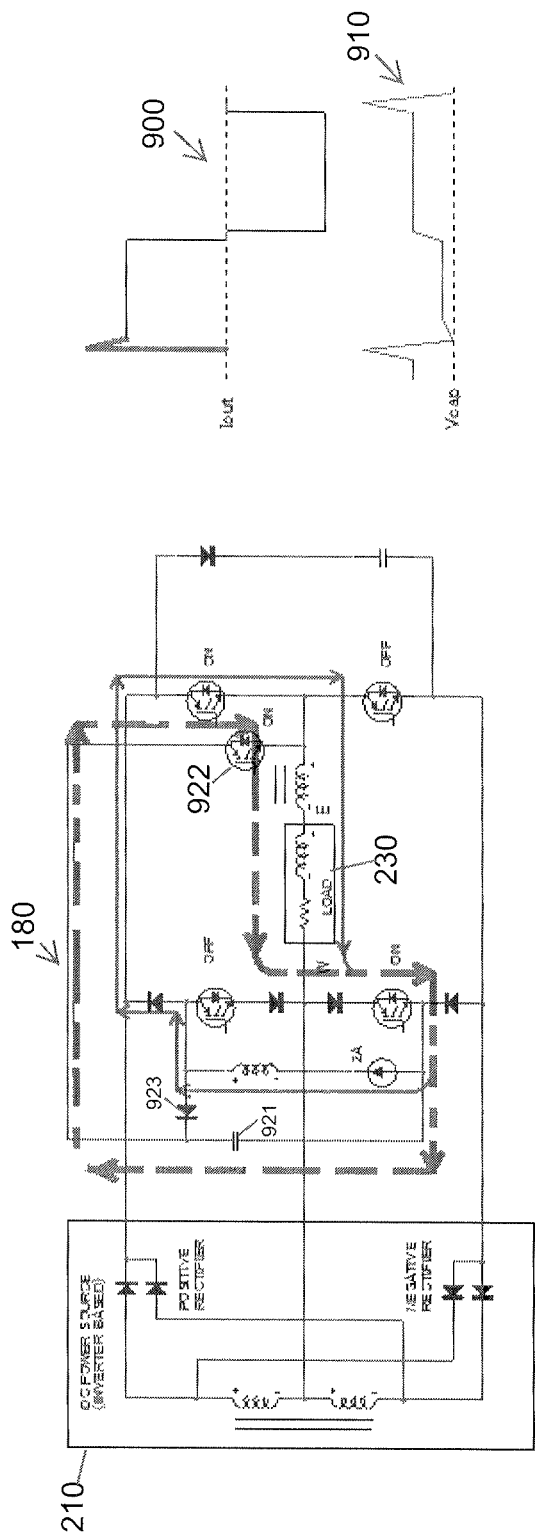

FIGS. 9A-9C illustrate the operation of another embodiment of a welding power source when implementing an AC welding output current waveform (e.g., represented as a simple square waveform) configured for independent discharge control of a superposition capacitor 921 through a switching transistor 922. The arc regulation circuit 170 including the superposition capacitor 921 as illustrated in FIGS. 9A-9C charges the superposition capacitor during the predefined deadtime between polarities and releases the energy to the load during the negative to positive transition, which has traditionally been the most difficult to reestablish. Charging twice and discharging once per cycle may reduce the deadtime required per cycle to charge the superposition capacitor while increasing the stored energy available to reignite the arc during the negative to positive transition. The independent discharge control switching transistor 922 is turned on to discharge the superposition capacitor 921 during the negative to positive transition, and eliminates an unintentional freewheeling path through the capacitor 821 illustrated in FIGS. 8A-8B. The output current 900 and capacitor voltage 910 are illustrated during the operation of the welding power source as described below.

The load 230 shown in FIGS. 9A-9C represents the resistance and inductance of the arc between the electrode E and the workpiece W and the welding cable path connecting the electrode E and workpiece W to the welding power source (i.e., the welding output circuit path). The electrode E, workpiece W, and the welding cable path are not a part of the welding power source, however.

Referring to the top portion of FIG. 9A, during the positive current portion of an AC waveform 900 (see thicker dark lines of the waveform 900) produced by the welding power source, current flows predominantly from the power conversion circuit 210, through the switching transistor 211 of the bridge circuit 160, through the load 230 (in the positive direction), and back to the power conversion circuit 210 through the common path (see thick arrows). Also, a low regulated current, provided by the arc regulator circuit 170, flows from the constant current source 216, through the inductor 215 (storing energy in the inductor), through the diode 217, through the switching transistor 211 of the bridge circuit 160, through the load 230 (in the positive direction), through the diode 219 and the switching transistor 214 of the arc regulation circuit 170, and back to the constant current source 216 (see less thick arrows). The independent discharge control switching transistor 922 prevents the superposition capacitor 921 from discharging during the positive current portion and the superposition capacitor 921 charges to the arc voltage illustrated in the capacitor voltage waveform 910.

Referring to the bottom portion of FIG. 9A, during the positive current decay portion of the AC waveform 900 (see thicker dark line of the waveform 900), the load 230 effectively acts as a power source, trying to keep current flowing. Current flows from the load 230, through the power conversion circuit 210 (in a free-wheeling manner), through the active snubber circuit 181, through the anti-parallel diode of the switching transistor 212 of the bridge circuit 160, and back to the load 230 (in the positive direction, see thick arrows) until the current fully decays. Also, a low regulated current, provided by the arc regulator circuit 170, flows from the constant current source 216, through the inductor 215, through diode 923, through the superposition capacitor 921 (charging the capacitor), and back to the constant current source 216 (see less thick arrows). Energy is already stored in the inductor. Once the superposition capacitor voltage exceeds the maximum supply voltage of the current source, it is the energy in the inductor that continues to charge the capacitor (all the while decaying as it gives up its energy to the capacitor). Even when current through the load 230 has fully decayed, the current from the arc regulator circuit 170 keeps flowing as described to charge the superposition capacitor 921 during the deadtime of the polarity change. The deadtime during the polarity change may be adjusted to provide the desired charge to the superposition capacitor.

During current decay, the bridge circuit 160 changes polarity. As the current through the load drops toward zero, the arc extinguishes and the arc regulation circuit applies a high voltage across the load to re-ignite the arc in the opposite polarity.

Referring to the top portion of FIG. 9B, during the polarity transition portion of the AC waveform 900 (see thicker dark line of the waveform 900), no significant current is provided by the power conversion circuit 210. The arc between the electrode E and the workpiece W briefly extinguishes. However, energy stored in the inductor 215 induces an arc-igniting voltage between the electrode E and the workpiece W. Current from the power conversion circuit can begin to flow again through the load in the opposite direction. Undershoot at the arc is limited by the inductor. Overshoot is not limited by the inductor since not all of the arc current flows through the inductor. Without the arc regulation circuit, the power conversion circuit would attempt to re-establish the arc. However, since the voltage provided by the power conversion circuit is usually limited (e.g., to 100 VDC), re-establishment of the arc may not occur. When the energy from the inductor 215 of the arc regulation circuit 170 is released, current flows from the inductor 215 through the switching transistor 213, through the diode 218, through the load 230 (in the negative direction), through the switching transistor 212 of the bridge circuit 160, through the diode 220, through the constant current source 216, and back to the inductor 215 (see arrows). As a result, the arc between the electrode E and the workpiece W quickly re-ignites in the negative direction and settles to a voltage level low enough for the power source to provide current. The independent discharge control switching transistor 922 prevents the superposition capacitor 921 from discharging as the output current transitions to the negative direction allowing the superposition capacitor 921 to retain the energy stored during the deadtime during the prior polarity transition and the positive current portion of the waveform 900.

Referring still to the top portion of FIG. 9B, during the negative current portion of the AC waveform 900 (see thicker dark lines of the waveform 900) produced by the welding power source, current flows predominantly from the power conversion circuit 210, through the load 230 (in the negative direction), through the switching transistor 212 of the bridge circuit 160, and back to the power conversion circuit 210 (see thick arrows). Also, a low regulated current, provided by the arc regulator circuit 170, flows from the constant current source 216, through the inductor 215 (storing energy in the inductor), through the switching transistor 213, through the diode 218, through the load 230 (in the negative direction), through the switching transistor 212 of the bridge circuit 160, through the diode 220 of the arc regulation circuit 170, and back to the constant current source 216 (see less thick arrows). The superposition capacitor 921 does not discharge during the negative current portion of the AC waveform 900 and retains the energy stored as illustrated by the capacitor voltage waveform 910.

Referring to the bottom portion of FIG. 9B, during the negative current decay portion of the AC waveform 900 (see thicker dark line of the waveform 900), the load 230 effectively acts as a power source, trying to keep current flowing. Current flows from the load 230, through the anti-parallel diode of the switching transistor 211 of the bridge circuit 160, through the active snubber circuit 181, through the power conversion circuit 210 (in a free-wheeling manner), and back to the load 230 (see thick arrows). Also, a low regulated current, provided by the arc regulator circuit 170, flows from the constant current source 216, through the inductor 215, through the diode 923, through the superposition capacitor 921 (charging the capacitor), back to the constant current source 216 (see less thick arrows). Energy is already stored in the inductor. Once the superposition capacitor voltage exceeds the maximum supply voltage of the current source, it is the energy in the inductor that continues to charge the capacitor (all the while decaying as it gives up its energy to the capacitor). Even when current through the load 230 has fully decayed, the current from the arc regulator circuit 170 keeps flowing as described to charge the superposition capacitor 921 during the deadtime of the polarity change. The deadtime during the polarity changes may be adjusted to provide adequate charging of the superposition capacitor.

Referring to FIG. 9C, upon making the transition back to the positive portion of the waveform 900 (i.e., the waveform is repeating), the inductor 215 will release stored energy through the load (but in the positive direction) causing the arc between the electrode E and the workpiece W to quickly re-ignite in the positive direction as described above for FIG. 9A. In addition, the superposition capacitor 921 discharges through switching transistor 922, through the load 230 (in the positive direction), through the diode 219 and the switching transistor 214 of the arc regulation circuit 170, and back to the superposition capacitor 921 (see dashed line arrows). The superposition capacitor 921 provides an additional surge of energy to assist in establishing or reestablishing the arc in the positive direction. Once the arc is established, the switching transistor 922 is switched OFF to discontinue discharging the superposition capacitor 921 and the process repeats as described above. In this manner, the arc regulation circuit 170 continuously adds a well-regulated low value of current to the welding output current provided by the power source to stabilize the arc as the current provided by the power conversion circuit decreases toward zero, and to immediately re-ignite the arc in the opposite polarity.

In summary, systems and methods providing low current regulation for AC arc welding processes to regulate arc welding performance are disclosed. In arc welding power source embodiments, configurations of bridge and arc regulation circuits allow for the directional switching of the welding output current through the welding output circuit path and induce a voltage between the electrode and the workpiece of the welding output circuit path that is sufficient to re-ignite the arc during polarity transition of the output current. The arc regulation circuit provides a high inductance level for storing energy, in both polarities, which induces the voltage level for re-igniting the arc during the zero crossing of the output current and provides low end stabilization of arc current.

In appended claims, the terms "including" and "having" are used as the plain language equivalents of the term "comprising"; the term "in which" is equivalent to "wherein." Moreover, in appended claims, the terms "first," "second," "third," "upper," "lower," "bottom," "top," etc. are used merely as labels, and are not intended to impose numerical or positional requirements on their objects. Further, the limitations of the appended claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A welding power source comprising:
   a power conversion circuit configured to convert an input current to an output current;
   a controller;
   a bridge circuit operatively connected to the power conversion circuit and configured to switch a direction of the output current through a welding output circuit path operatively connected to a welding output of the welding power source at the command of the controller;
   an arc regulation circuit operatively connected to the bridge circuit and configured to induce a voltage between an electrode and a workpiece of the welding output circuit path sufficient for arc re-ignition during polarity transition of the output current, and further configured to induce an overshoot current to facilitate arc re-ignition during at least a negative to positive polarity transition of the output current;
   wherein the arc regulation circuit comprises:
     an inductor configured to store energy; and
     a constant current source configured to supply regulated constant current to the inductor; and
   wherein an output of the arc regulation circuit is connected to the bridge circuit.

2. The welding power source of claim 1, wherein the arc regulation circuit includes a superposition capacitor configured to provide the overshoot current.

3. The welding power source of claim 2, wherein the arc regulation circuit includes an independent discharge control switch configured to selectively discharge the superposition capacitor during the negative to positive polarity transition of the output current.

4. The welding power source of claim 3, wherein an inductance value of the at least one inductor is between about 10 to 100 milli-henries.

5. The welding power source of claim 1, wherein the constant current source is configured to provide an adjustable current of between 2 amps and 10 amps.

6. The welding power source of claim 1, wherein the power conversion circuit, the bridge circuit, and the arc regulation circuit are configured to provide any of a DC positive welding operation, a DC negative welding operation, and an AC welding operation at the command of the controller of the welding power source.

7. The welding power source of claim 1, wherein the power conversion circuit is transformer based with a half bridge output topology.

8. The welding power source of claim 1, wherein the power conversion circuit includes a DC output topology.

9. The welding power source of claim 1, wherein the power conversion circuit is a chopper-based circuit.

10. The welding power source of claim 1, wherein the bridge circuit includes at least two switching transistors.

11. A welding power source comprising:
   means for converting an input current to an output current;
   means for switching a direction of the output current through a welding output circuit path operatively connected to a welding output of the welding power source to provide at least an AC welding operation;
   means for inducing a voltage between a welding electrode and a welding workpiece of the welding output circuit path during a polarity transition of the output current to automatically re-establish an arc between the welding electrode and the workpiece in an opposite polarity, wherein an output of the means for inducing a voltage is connected to the means for switching a direction of the output current; and
   means for inducing an overshoot current to facilitate arc re-ignition during at least a negative to positive polarity transition of the output current, wherein the means for inducing an overshoot current comprises an inductor and a constant current source configured to supply regulated constant current to the inductor.

12. A method comprising:
   converting an input current to an output current in a welding power source;
   switching, using a bridge circuit, a direction of the output current through a welding output circuit path operatively connected to a welding output of the welding power source from a first direction to a second direction at the command of a controller of the welding power source;
   inducing, using an arc regulation circuit, a voltage level between a welding electrode and a workpiece of the welding output circuit path sufficient to automatically re-ignite an arc between the electrode and the workpiece in the second direction as part of switching to the second direction; and
   inducing, using the arc regulation circuit, an overshoot current to facilitate arc re-ignition during at least a negative to positive polarity transition of the output current, wherein inducing the overshoot current comprises supplying a regulated constant current from a constant current source of the arc regulation circuit to an inductor of the arc regulation circuit, and wherein an output of the arc regulation circuit is connected to the bridge circuit.

13. The method of claim 12, further comprising:
   switching a direction of the output current through the welding output circuit path from the second direction to the first direction at the command of the controller of the welding power source; and
   inducing a voltage level between the welding electrode and the workpiece of the welding output circuit path sufficient to automatically re-ignite an arc between the electrode and the workpiece in the first direction as part of switching to the first direction.

14. The method of claim 12, wherein the step of inducing an overshoot current is achieved by the arc regulation circuit having at least on superposition capacitor.

15. A welding power source comprising:
   a bridge circuit configured to provide an AC welding output current; and
   an arc regulation circuit operatively connected to the bridge circuit and configured to induce a voltage at a welding output of the welding power source being of sufficient magnitude to automatically re-ignite an arc in an output circuit path connected to the welding output upon reversal of a polarity of the welding output current through the output circuit path, and further configured to induce an overshoot current to facilitate arc re-ignition during at least a negative to positive polarity transition of the output current;

the arc regulation circuit comprising:
an inductor configured to store energy; and
a constant current source configured to supply regulated constant current to the inductor; and wherein an output of the arc regulation circuit is connected to the bridge circuit.

16. A welding power source comprising:
a current switching circuit comprising:
at least one inductor,
at least one constant current source connected in series with the at least one inductor and configured to supply regulated constant current to the at least one inductor, and
at least one superposition capacitor,
wherein the at least one inductor, the at least one constant current source, and the at least one superposition capacitor are configured to induce a voltage across a load connected to a welding output of the welding power source sufficient to re-ignite a welding arc across the load upon reversal of a polarity of a welding output current through the load; and
wherein the at least one superposition capacitor is connected in parallel to the at least one inductor and the at least one constant current source.

17. The welding power source of claim 16, wherein the current switching circuit is configured as one of a half bridge circuit or a full bridge circuit.

18. The welding power source of claim 1, wherein the constant current source comprises at least one of: a chopper buck regulator; or a voltage source and a resistor.

19. The welding power source of claim 1, wherein the inductor and the constant current source are connected in series within the arc regulation circuit.

20. The welding power source of claim 19, wherein a superposition capacitor is connected in parallel to the inductor and the constant current source within the arc regulation circuit.

21. The welding power source of claim 1, wherein the power conversion circuit is configured to:
receive alternating current from an external power source; and
output direct current into the arc regulation circuit and the bridge circuit.

22. A welding power source comprising:
a power conversion circuit configured to convert an input current to an output current;
a controller;
a bridge circuit operatively connected to the power conversion circuit and configured to switch a direction of the output current through a welding output circuit path operatively connected to a welding output of the welding power source at the command of the controller;
an arc regulation circuit operatively connected to the bridge circuit and configured to induce a voltage between an electrode and a workpiece of the welding output circuit path sufficient for arc re-ignition during polarity transition of the output current, and further configured to induce an overshoot current to facilitate arc re-ignition during at least a negative to positive polarity transition of the output current;
wherein the arc regulation circuit comprises:
an inductor configured to store energy; and
a constant current source configured to supply regulated constant current to the inductor; and
two switching transistors that are configured to selectively induce a high voltage level in either polarity.

* * * * *